(12) United States Patent
Ran et al.

(10) Patent No.: US 11,614,744 B2
(45) Date of Patent: Mar. 28, 2023

(54) SELF-MOVING APPARATUS AND METHOD FOR CONTROLLING SAME

(71) Applicant: Positec Power Tools (Suzhou) Co., Ltd, Suzhou (CN)

(72) Inventors: Yuanzhong Ran, Jiangsu (CN); Jiang Du, Jiangsu (CN); Kai Wang, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 16/613,816

(22) PCT Filed: Nov. 14, 2018

(86) PCT No.: PCT/CN2018/115436
§ 371 (c)(1),
(2) Date: Nov. 15, 2019

(87) PCT Pub. No.: WO2019/096166
PCT Pub. Date: May 23, 2019

(65) Prior Publication Data
US 2020/0272165 A1    Aug. 27, 2020

(30) Foreign Application Priority Data

Nov. 14, 2017   (CN) .......................... 201711123631.2
Apr. 20, 2018   (CN) .......................... 201810362322.9
Apr. 20, 2018   (CN) .......................... 201810362730.4

(51) Int. Cl.
*G05D 1/02*  (2020.01)
*G05D 1/00*  (2006.01)

(52) U.S. Cl.
CPC ......... *G05D 1/0255* (2013.01); *G05D 1/0022* (2013.01); *G05D 1/0061* (2013.01); *G05D 1/0238* (2013.01); *G05D 2201/0208* (2013.01)

(58) Field of Classification Search
CPC .. G05D 1/0255; G05D 1/0022; G05D 1/0061; G05D 1/0238; G05D 2201/0208; G05D 2201/0213
See application file for complete search history.

(56) References Cited

U.S. PATENT DOCUMENTS 5,279,672 A *  1/1994  Betker ................ A47L 11/4011
                                                  134/18
6,173,233 B1   1/2001  Janutka et al.
(Continued)

FOREIGN PATENT DOCUMENTS

CN            2688463 Y      3/2005
CN          102139164 A      8/2011
(Continued)

*Primary Examiner* — Dale Moyer
(74) *Attorney, Agent, or Firm* — Dentons US LLP

(57) ABSTRACT

Embodiments of the present invention relates to a self-moving apparatus and a method for controlling same, the self-moving apparatus including: a housing; a movement module for driving the housing to move; an ultrasonic module configured to transmit an ultrasonic signal and receive an echo signal formed through reflection of an obstacle; and a control module installed on the housing and connected to the ultrasonic module, to implement an ultrasonic detection function by processing the echo signal, thereby controlling a movement mode of the movement module. The control module can control disabling of the ultrasonic detection function according to a received preset signal.

14 Claims, 11 Drawing Sheets

(56) References Cited

U.S. PATENT DOCUMENTS

| | | |
|---|---|---|
| 7,155,309 B2 | 12/2006 | Peless et al. |
| 8,503,265 B2 | 8/2013 | Akiyama et al. |
| 8,600,553 B2 | 12/2013 | Svendsen et al. |
| 8,634,960 B2 * | 1/2014 | Sandin ............... B60L 50/66 |
| | | 700/258 |
| 9,399,284 B2 | 7/2016 | Kwon et al. |
| 11,030,902 B2 * | 6/2021 | Bakhishev ............ G06N 20/00 |
| 2005/0085947 A1 | 4/2005 | Aldred et al. |
| 2008/0281470 A1 * | 11/2008 | Gilbert, Jr. ......... A47L 11/4066 |
| | | 700/259 |
| 2010/0037418 A1 | 2/2010 | Hussey et al. |
| 2011/0241858 A1 | 10/2011 | Tsuzuki |
| 2012/0017684 A1 | 1/2012 | Reiche et al. |
| 2016/0202703 A1 | 7/2016 | Matsubara |
| 2017/0238460 A1 | 8/2017 | Mackean et al. |
| 2020/0150655 A1 * | 5/2020 | Artes ................... G05D 1/0016 |
| 2021/0089040 A1 * | 3/2021 | Ebrahimi Afrouzi ....................... |
| | | A47L 9/2894 |

FOREIGN PATENT DOCUMENTS

| | | | |
|---|---|---|---|
| CN | 202026599 U | | 11/2011 |
| CN | 103365229 A | * | 10/2013 |
| CN | 103365229 A | | 10/2013 |
| CN | 104111460 A | | 10/2014 |
| CN | 104718870 A | | 6/2015 |
| CN | 104737698 A | | 7/2015 |
| CN | 104871030 A | | 8/2015 |
| CN | 105223951 A | | 1/2016 |
| CN | 105683777 A | | 6/2016 |
| CN | 106108947 A | | 11/2016 |
| CN | 206209104 U | | 5/2017 |
| DE | 102014208434 A1 | | 11/2015 |
| EP | 0664018 B1 | | 7/1997 |
| EP | 2426869 A1 | | 3/2012 |
| EP | 2667223 A1 | | 11/2013 |
| EP | 2939513 A1 | | 11/2015 |
| EP | 3298874 A1 | | 3/2018 |
| EP | 3342269 A1 | | 7/2018 |
| GB | 2313191 A | | 11/1997 |
| JP | 2001-112102 A | | 4/2001 |
| JP | 2006018636 A | | 1/2006 |
| JP | 2016212011 A | | 12/2016 |
| KR | 10-0504861 B1 | | 7/2004 |
| KR | 101166442 B1 | | 7/2012 |
| WO | 0078213 A2 | | 12/2000 |

* cited by examiner

SELF-MOVING APPARATUS AND METHOD FOR CONTROLLING SAME

This application is a National Stage application of International Application No. PCT/CN2018/115436 filed on Nov. 14, 2018, and claims priority to Chinese Application Nos. 201711123631.2 filed Nov. 14, 2017, 201810362730.4, filed Apr. 20, 2018, and 201810362322.9 filed Apr. 20, 2018, which are hereby incorporated by reference in their entirety as if fully set forth herein.

BACKGROUND

Technical Field

Embodiments of the present invention relates to a self-moving apparatus and a method for controlling same.

Related Art

With the continuous improvement of computer technologies and artificial intelligence technologies, a self-moving apparatuses similar to an autonomous apparatus is gradually used in people's life. Companies such as Samsung and Electrolux have developed a fully automatic vacuum cleaner which has already entered the market. Such fully automatic vacuum cleaner is usually small in size and integrated with an environmental sensor, a self-driven system, a dust extraction system, and a battery and charging system, which can automatically cruise and vacuum within a working area without manual control, automatically return to a charging station to be connected and charged when being in low energy, and then continue cruising and vacuuming. At the same time, companies such as Husqvarna have developed a similar autonomous lawn mower that can automatically mow the grass and be charged in a lawn of a user without needing user's intervention. Because such self-moving apparatus does not require further effort for management after being set once, and the user is liberated from tedious, time-consuming, and laborious housework such as cleaning and lawn maintenance, such self-moving apparatus is greatly welcomed.

There are usually obstacles that hinder movement of the self-moving apparatus within the working area. Therefore, the self-moving apparatus is required to have a function for recognizing the obstacles, so as to further automatically evade the obstacle when encountering an obstacle or automatically bypass the obstacle before encountering an obstacle.

In conventional technologies, a contact obstacle-avoidance means is used on the self-moving apparatus. In the technologies, a collision sensor is disposed on a body of the self-moving apparatus. When the self-moving apparatus collides with an obstacle, the collision sensor generates a collision signal, and a control module of the self-moving apparatus receives the collision signal, and determines that an obstacle exists in a direction in which the self-moving apparatus moves forward, to further control the self-moving apparatus to turn or move rearward for avoiding obstacles

SUMMARY

In the contact obstacle-avoidance mode, the self-moving apparatus can recognize the obstacle only when colliding with the obstacle. Such mode not only requires high collision strength for the body of the self-moving apparatus, but also still cannot be adapted to some working conditions in which a collision is unsuitable to occur, which increases production costs of the self-moving apparatus. One aspect of the present invention is intended to provide a self-moving apparatus that can implement non-contact obstacle avoidance, and in particular, to provide a self-moving apparatus that can operate stably and can implement non-contact obstacle avoidance.

The technical solution used by embodiments of the present invention to resolve the problem in the prior art is as follows:

A self-moving apparatus, comprising: a housing; a movement module installed on the housing for driving the housing to move; an ultrasonic module installed on the housing for transmitting an ultrasonic signal and receiving an echo signal formed through reflection of an obstacle; and a control module installed on the housing and connected to the ultrasonic module, to implement an ultrasonic detection function by processing the echo signal, thereby controlling a movement mode of the movement module; wherein the control module can control disabling of the ultrasonic detection function according to a received preset signal.

In one embodiment, the preset signal comprises a manual control signal.

In one embodiment, the manual control signal is generated by a user operation.

In one embodiment, the self-moving apparatus comprises a communication module connected to the control module, the communication module receiving the manual control signal sent by a terminal.

In one embodiment, the self-moving apparatus comprises an operating module connected to the control module, the manual control signal being generated by the operating module.

In one embodiment, the preset signal comprises an abnormal signal.

In one embodiment, the abnormal signal comprises a valid signal that satisfies a preset condition.

In one embodiment, the preset condition comprises that a time being greater than preset time and/or a number being greater than a preset number.

In one embodiment, the valid signal comprises an echo signal with strength greater than preset strength.

In one embodiment, the self-moving apparatus comprises an energy module connected to the control module, the control module receiving an energy signal of the energy module, and the abnormal signal comprising the energy signal with energy less than preset energy.

In one embodiment, the disabling of the ultrasonic detection function comprises stopping operation of the ultrasonic module.

In one embodiment, the disabling of the ultrasonic detection function comprises stopping processing the echo signal by the control module.

In one embodiment, a detection range of the ultrasonic module in a height direction is a first height range, and the self-moving apparatus further comprises an auxiliary detecting module configured to detect an obstacle within a second height range.

In one embodiment, the control module controls a movement mode of the movement module according to an output signal of the ultrasonic module and/or the auxiliary detecting module.

A method for controlling a self-moving apparatus, the self-moving apparatus comprising a movement module, an ultrasonic module, and a control module, the control module being connected to the ultrasonic module to implement an ultrasonic detection function, thereby controlling a movement mode of the movement module; wherein the control method comprises: transmitting, by the ultrasonic module, an ultrasonic signal and receiving an echo signal formed through reflection of an obstacle; and controlling, by the control module, disabling of the ultrasonic detection function based on at least strength of the echo signal.

A method for controlling a self-moving apparatus, the self-moving apparatus comprising a movement module, an ultrasonic module, and a control module, the ultrasonic module transmitting an ultrasonic signal and receiving an echo signal formed through reflection of an obstacle, and the control module being connected to the ultrasonic module to implement an ultrasonic detection function, thereby controlling a movement mode of the movement module; wherein the control method comprises: receiving, by the control module, a preset signal; and controlling, by the control module, disabling of the ultrasonic detection function based on at least a preset signal.

A method for controlling a self-moving apparatus is provided. The self-moving apparatus includes a movement module, an ultrasonic module, and a control module, the ultrasonic module transmitting an ultrasonic signal and receiving an echo signal formed through reflection of an obstacle, and the control module being connected to the ultrasonic module to implement an ultrasonic detection function, thereby controlling a movement mode of the movement module; and the control method includes: receiving, by the control module, a preset signal; and controlling, by the control module, disabling of the ultrasonic detection function based on at least the preset signal.

In some specific working scenarios (for example, in a heavily rainy day, when a lawn height exceeds a normal value, when an obstacle adheres to a probe surface, and when returning to a charging station across a border line, etc.), if the ultrasonic detection function is enabled, a machine will continuously detect the obstacle and continually take obstacle avoidance measures such as changing the movement mode. In such specific working scenarios, controlling disabling of the ultrasonic detection function can ensure normal operation of the machine.

In addition, if an ultrasonic probe is always in a working state after an autonomous lawn mower is enabled, on the one hand, power consumption is increased, and single life time becomes shorter, and on the other hand, service life of the ultrasonic probe is shortened. Controlling disabling of the ultrasonic detection function through a signal such as residual energy can reduce service time and energy consumption of the ultrasonic probe, thereby prolonging the service life of the ultrasonic probe and reducing the energy loss of the autonomous lawn mower.

A method for controlling an autonomous lawn mower is provided in an embodiment of the present invention, the autonomous lawn mower including a main control board and an ultrasonic probe, and the main control board being connected to the ultrasonic probe.

The method includes:
receiving, by the main control board, a control signal sent by a signal apparatus, the control signal being used to indicate enabling or disabling of a detection function of the ultrasonic probe;
generating, by the main control board according to the control signal, a switch signal for controlling turn-on or turn-off of the ultrasonic probe; and
turning on or turning off, by the main control board, the ultrasonic probe according to the switch signal.

In one of the embodiments, the signal apparatus includes any of the following:

a terminal wirelessly connected to the main control board, the ultrasonic probe, an operating module, or an energy module of the autonomous lawn mower.

In one embodiment, the signal apparatus is the ultrasonic probe, and the control signal is an echo signal sent by the ultrasonic probe. The receiving, by the main control board, a control signal sent by a signal apparatus includes:
receiving, by the main control board, an echo signal formed through reflection of the ultrasonic signal sent by the ultrasonic probe by an obstacle;
acquiring, by the main control board, a distance between the autonomous lawn mower and the obstacle according to the echo signal; and
if the distance is less than a preset distance, determining, by the main control board, that the echo signal is used to indicate disabling of the detection function of the ultrasonic probe.

In one of the embodiments, before the receiving, by the main control board, an echo signal formed through reflection of the ultrasonic signal sent by the ultrasonic probe by an obstacle, the method further includes:
acquiring, by the main control board, a transmission time at which the ultrasonic probe transmits an ultrasonic signal; and
the acquiring, by the main control board, a distance between the autonomous lawn mower and the obstacle according to the echo signal includes:
acquiring, by the main control board, the distance between the autonomous lawn mower and the obstacle according to the transmission time, a receiving time of the echo signal, and a propagation speed of the ultrasonic wave in the air.

In one of the embodiments, the autonomous lawn mower further includes a temperature sensor connected to the main control board. Before the acquiring, by the main control board, the distance between the autonomous lawn mower and the obstacle according to the transmission time, a receiving time of the echo signal, and a propagation speed of the ultrasonic wave in the air, the method further includes:
acquiring, by the main control board, a temperature parameter of a current environment monitored by the temperature sensor; and
determining, by the main control board, a propagation speed of the ultrasonic wave in the air according to the temperature parameter.

In one of the embodiments, the signal apparatus is the ultrasonic probe, and the control signal is an ultrasonic signal transmitted by the ultrasonic probe. The receiving, by the main control board, a control signal sent by a signal apparatus includes:
acquiring, by the main control board, a transmission time at which the ultrasonic probe transmits the ultrasonic signal and starting a timer at the transmission time point; and
if the main control board does not receive the echo signal sent by the ultrasonic probe after the timer times out, determining, by the main control board, that the ultrasonic signal is used to indicate disabling of the detection function of the ultrasonic probe.

In one of the embodiments, after the receiving, by the main control board, a control signal sent by a signal apparatus, the method further includes:
acquiring, by the main control board, a turn-off time at which the ultrasonic probe is turned off;
determining, by the main control board, a restart time according to the turn-off time, a maximum detection distance of the ultrasonic probe, and a travelling speed of the autonomous lawn mower; and turning on, by the main control board, the ultrasonic probe within a preset time period before the restart time according to the restart time.

In one of the embodiments, the signal apparatus is an energy module of the autonomous lawn mower, and the control signal is a low-energy signal sent by the energy module. The receiving, by the main control board, a control signal sent by a signal apparatus includes:

acquiring, by the main control board, a low-energy signal sent by the energy module, the low-energy signal being a signal sent by the energy module when a current electric quantity of the autonomous lawn mower is less than a preset electric quantity; and determining, by the main control board according to the low-energy signal, that the low-energy signal is used to indicate disabling of the detection function of the ultrasonic probe.

The foregoing main control board of the autonomous lawn mower receives the control signal sent by the signal apparatus for indicating enabling or disabling of the detection function of the ultrasonic probe, generates, according to the control signal, the switch signal for controlling turn-on or turn-off of the ultrasonic probe, and turns on or turns off the ultrasonic probe according to the switch signal. The signal apparatus includes the terminal wirelessly connected to the main control board, the ultrasonic probe, and the operating module or the energy module of the autonomous lawn mower. The control signal sent by any of the foregoing signal apparatuses can be used to control the working state of the ultrasonic probe of the autonomous lawn mower, thereby avoiding problems such as single-package duration being shortened and the probe service life being shortened as a result of frequent enabling of the ultrasonic obstacle-avoidance function, and interference to normal working of the autonomous lawn mower in the special working condition.

A method for controlling an autonomous lawn mower is further provided in the embodiments of the present invention, the autonomous lawn mower including an ultrasonic probe, and the method includes:

transmitting an ultrasonic signal through the ultrasonic probe;

receiving an echo signal through the ultrasonic probe, the echo signal being formed through reflection of the ultrasonic signal; and performing an avoiding operation according to the ultrasonic signal and the echo signal, and after that, if a number of valid signals in the echo signals received within a preset time is greater than a preset threshold, performing an action of terminating the avoiding operation, the valid signal being used as an echo signal for the autonomous lawn mower to perform the avoiding operation.

In one of the embodiments, the performing an action of terminating the avoiding operation includes:

disabling a detection function of the ultrasonic probe.

In one of the embodiments, the performing an action of terminating the avoiding operation includes:

disabling a walking system for enabling the autonomous lawn mower to move forward, move backward, or turn in the autonomous lawn mower.

In one of the embodiments, the method further includes:

disabling a cutting system for cutting grass in the autonomous lawn mower if a number of valid signals in the echo signals received within a preset time is greater than a preset threshold.

In one of the embodiments, the method further includes:

outputting alarm information through a speaker and/or an indicator light if the number of the valid signals in the echo signals received within a preset time is greater than the preset threshold, the alarm information being used to indicate that the autonomous lawn mower is abnormal.

In one of the embodiments, the method further includes:

sending prompt information to a terminal apparatus if the number of the valid signals in the echo signals received within a preset time is greater than the preset threshold, the prompt information being used to indicate that the autonomous lawn mower is abnormal, and the terminal apparatus being wirelessly connected to the autonomous lawn mower.

An autonomous lawn mower is further provided in the embodiments of the present invention, including:

an ultrasonic probe, a walking system, a cutting system, and a control module of any of the foregoing autonomous lawn mowers.

A control module of an autonomous lawn mower is provided in the embodiments of the present invention, including:

a receiving module configured to receive a control signal sent by a signal apparatus, the control signal being used to indicate enabling or disabling of a detection function of an ultrasonic probe, and the signal apparatus including any of the following: a terminal wirelessly connected to a main control board, the ultrasonic probe, an operating module, or an energy module of the autonomous lawn mower;

a generating module configured to generate, according to the control signal, a switch signal for controlling turn-on or turn-off of the ultrasonic probe; and an execution module configured to turn on or turn off the ultrasonic probe according to the switch signal.

A control module of an autonomous lawn mower is provided in the embodiments of the present invention, including:

a memory; a processor; and a computer program.

The computer program is stored in the memory and is configured to perform the method in any of a first aspect by the processor to control enabling or disabling of the detection function of the ultrasound probe.

A computer-readable storage medium is provided in the embodiments of the present invention, on which a computer program is stored, the computer program being executed by the processor to implement the method in any of the first aspect.

The autonomous lawn mower receives the echo signal formed through reflection of the ultrasonic signal transmitted by the ultrasonic probe, and determines, according to the transmitted ultrasonic signal and the echo signal, whether to perform the avoiding operation, so that the autonomous lawn mower can avoid an obstacle effectively, and determines whether a number of valid signals received within the preset time is greater than the preset threshold. When the number of the valid signals is greater than the preset threshold, the action of terminating the avoiding operation is performed, thereby terminating unnecessary avoidance and improving stability and reliability of the autonomous lawn mower during working.

A method for avoiding an obstacle by a self-moving apparatus is further provided in the embodiments of the present invention, including: acquiring a first signal indicating that there is an obstacle within a first height range; acquiring a second signal indicating that there is an obstacle within a second height range; issuing an obstacle avoidance instruction according to the first signal and the second signal; and changing a walking path of the self-moving apparatus according to the obstacle avoidance instruction.

The foregoing method for avoiding an obstacle by the self-moving apparatus may be used to detect obstacles within different height ranges. When working in complex environments with flowers, trunks, and bushes, the self-moving apparatus performs an avoidance action using the obstacle avoidance method, which is more intelligent to be adapted to a complex working environment, safety of the self-moving apparatus is improved.

In one of the embodiments, the step of the acquiring a first signal indicating that there is an obstacle within a first height range specifically includes: transmitting an ultrasonic signal to a surrounding environment; receiving a reflection signal of the ultrasonic signal by the surrounding environment; determining, according to the reflection signal, whether there is an obstacle within the first height range.

In one of the embodiments, the step of the determining, according to the reflection signal, whether there is an obstacle within the first height range specifically includes: acquiring a first preset parameter value indicating that there is an obstacle within a first height range; when a first parameter value of the reflection signal is greater than the first preset parameter value indicating that there is the obstacle within the first height range, determining that there is an obstacle within the first height range.

In one of the embodiments, the first parameter value of the reflection signal is a strength value of the reflection signal.

In one of the embodiments, the step of the acquiring a first signal indicating that there is an obstacle within a first height range further includes: converting, into a second parameter value of the first signal, a time difference between a time at which an ultrasonic wave is transmitted and a time at which the ultrasonic wave is received, the second parameter value of the first signal being used to represent a distance between the self-moving apparatus and the obstacle within the first height range.

In one of the embodiments, the method further includes the following steps: acquiring a second preset value of the first signal; and when a first signal parameter value is less than the second preset parameter value of the first signal, issuing an obstacle avoidance instruction.

In one of the embodiments, the step of the acquiring a second signal indicating that there is an obstacle within a second height range specifically includes: acquiring a second signal parameter value indicating that there is an obstacle within the second height range after the self-moving apparatus collides with an obstacle within the second height range.

In one of the embodiments, the method further includes the following steps: acquiring a preset parameter value of the second signal; and when a second signal parameter value is greater than the preset parameter value of the second signal, issuing an obstacle avoidance instruction.

In one of the embodiments, a minimum value of the first height range is not greater than a maximum value of the second height range.

A self-moving apparatus is further provided in the embodiments of the present invention, including: a first detecting module configured to acquire a first signal indicating that there is an obstacle within a first height range; and a second detecting module disposed below the first detecting module configured to acquire a second signal indicating that there is an obstacle within a second height range;

a processing module configured to issue an obstacle avoidance instruction according to the first signal and the second signal; and a control module configured to control a walking path of the self-moving apparatus according to the obstacle avoidance instruction.

The foregoing self-moving apparatus may detect obstacles within different height ranges. When working in complex environments with flowers, trunks, and bushes, the self-moving apparatus performs an avoidance action, which is more intelligent to be adapted to a complex working environment, and safety of the self-moving apparatus is improved.

In one of the embodiments, the first detecting module includes an ultrasonic probe, the ultrasonic probe being configured to transmit and receive an ultrasonic signal, the ultrasonic probe being installed on a fixing base of the ultrasonic probe, and the fixing base of the ultrasonic probe being disposed on a housing of the self-moving apparatus.

In one of the embodiments, the second detecting module includes a magnetic block and a Hall element for sensing the magnetic block, the Hall element being configured to detect whether the magnetic block is displaced, and the Hall element including at least two Hall sensors.

A minimum value of a first height range is set to be not greater than a maximum value of a second height range, and there is no gap between the first height range and the second height range. Then, the first height range and the second height range substantially cover a height of an obstacle. The obstacle is detected using characteristics of an ultrasonic wave within the first height range covered by the ultrasonic wave. The obstacle is detected through collision contact within the second height range that cannot be covered by the ultrasonic wave. In this way, obstacles within different height ranges may be detected using the foregoing obstacle avoidance methods, and different obstacle avoidance means may be further used.

BRIEF DESCRIPTION OF THE DRAWINGS

The foregoing objectives, technical solutions, and beneficial effects of embodiments of the present invention may be implemented by using the accompanying drawings below.

DETAILED DESCRIPTION

In the embodiments of the present invention, a self-moving apparatus may be a similar autonomous apparatus such as an autonomous lawn mower, an autonomous snowplow, an autonomous cleaning apparatus, an autonomous scrubber, and the like that can work automatically. The autonomous lawn mower is used as an example herein.

An ultrasonic wave is characterized with a high frequency, a short wavelength, and few diffraction phenomena, especially good directivity, and a capability of becoming a ray for directional propagation. The ultrasonic wave generates significant reflection when encountering an impurity or an interface and forms an echo wave, and can generate a Doppler effect when encountering a moving object. In the embodiment of the present invention, the autonomous lawn mower is equipped with an ultrasonic probe developed using characteristics of the ultrasonic wave, the ultrasonic probe being configured to measure a distance between the autonomous lawn mower during working and an obstacle. When the distance between the autonomous lawn mower and the obstacle is less than a preset value, the autonomous lawn mower automatically performs an avoidance action to avoid causing damage to the autonomous lawn mower and even causing an accident as a result of a collision with the obstacle.

Figure 1:
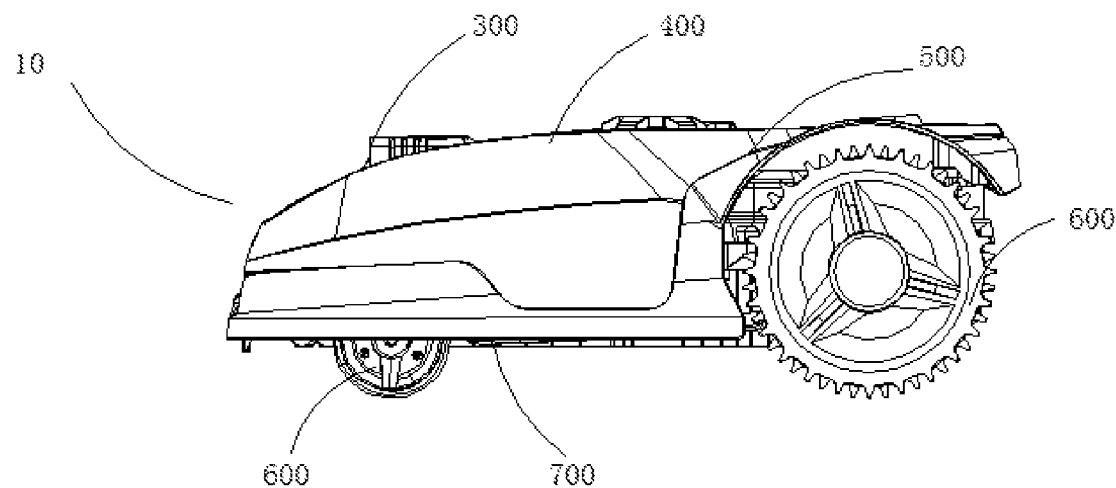
FIG. 1 is a schematic structural diagram of an autonomous lawn mower according to an embodiment of the present invention.

FIG. 1 is a schematic structural diagram of an autonomous lawn mower according to an embodiment of the present invention. As shown in FIG. 1, an autonomous lawn mower 10 provided in this embodiment includes a housing 400; a movement module 600 installed on the housing 400 for driving the housing 400 to move; an ultrasonic module 300 installed on the housing 400 for transmitting an ultrasonic signal, when the ultrasonic signal contacts an obstacle and forms an echo wave by reflection, the ultrasonic module 300 receiving the echo signal; a control module 500 installed on the housing 400 and electrically connected to the ultrasonic module configured to: process the echo signal of the ultrasonic module 300 and detect an object within an detection range of the ultrasonic module 300, and through analyzing parameters such as a distance and strength, control a movement mode of the movement module 600; and a cutting module 700 installed on the housing 400 configured to cut a lawn. In particular, the movement mode includes: keeping going straight, turning, moving backward, slowing down, or the like. In one embodiment, when the control module 500 determines that there is an obstacle within a set range of the autonomous lawn mower 10 in a moving direction, the movement module 600 is controlled to turn.

Figure 2:
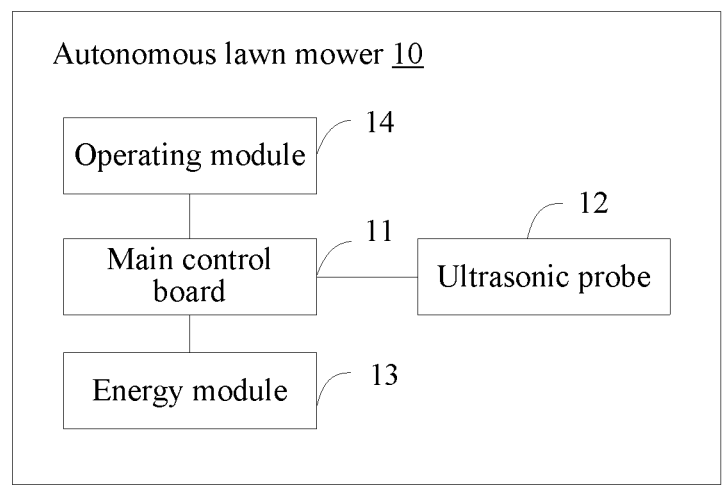
FIG. 2 is a schematic diagram of some components of an autonomous lawn mower according to an embodiment of the present invention.

FIG. 2 is a schematic diagram of some components of an autonomous lawn mower according to an embodiment of the present invention. As shown in FIG. 2, a control module 500 includes a main control board 11, an ultrasonic module 300 including an ultrasonic probe 12, and an autonomous lawn mower 10 further including an energy module 13. The main control board 11 is connected to the ultrasonic probe 12 and the energy module 13 respectively.

The ultrasonic probe 12 is configured to transmit an ultrasonic signal, receive an echo signal formed through reflection of the ultrasonic signal by the obstacle, and transmit the echo signal to the main control board 11.

The energy module 13 is configured to monitor a current electric quantity of the autonomous lawn mower 10 in real time, and send a low-energy signal to the main control board 11 when the current electric quantity is insufficient, so that the main control board 11 returns to a charging station according to a preset return path.

In one embodiment, the autonomous lawn mower 10 further includes an operating module 14, the operating module 14 being connected to the main control board 11. The operating module 14 in this embodiment may be a touch display apparatus, or may be a machine-operating button, which is not specifically limited herein in this embodiment.

In one embodiment, the autonomous lawn mower 10 further includes a temperature sensor 15, the temperature sensor 15 being connected to the main control board 11, and the temperature sensor 15 being configured to detect a temperature parameter of the autonomous lawn mower 10 in a current working environment and send the temperature parameter to the main control board 11. Those skilled in the art may learn that a propagation speed of the ultrasonic wave in the air varies depending on different temperatures. A higher temperature leads to a faster propagation speed. Control accuracy of the main control board of the autonomous lawn mower is improved through disposing a temperature sensor on the autonomous lawn mower.

A method for controlling an autonomous lawn mower is provided in one embodiment of the present invention, so as to resolve problems such as single life time being shortened and service life of the probe being shortened as a result of frequent enabling of an ultrasonic obstacle avoidance function, and interference to normal working of a machine in a special working condition. In order to make the foregoing objectives, features, and advantages of the embodiment of the present invention more clearly and easy to understand, the embodiment of the present invention is described in detail below with reference to the accompanying drawings and specific implementations.

Figure 3:
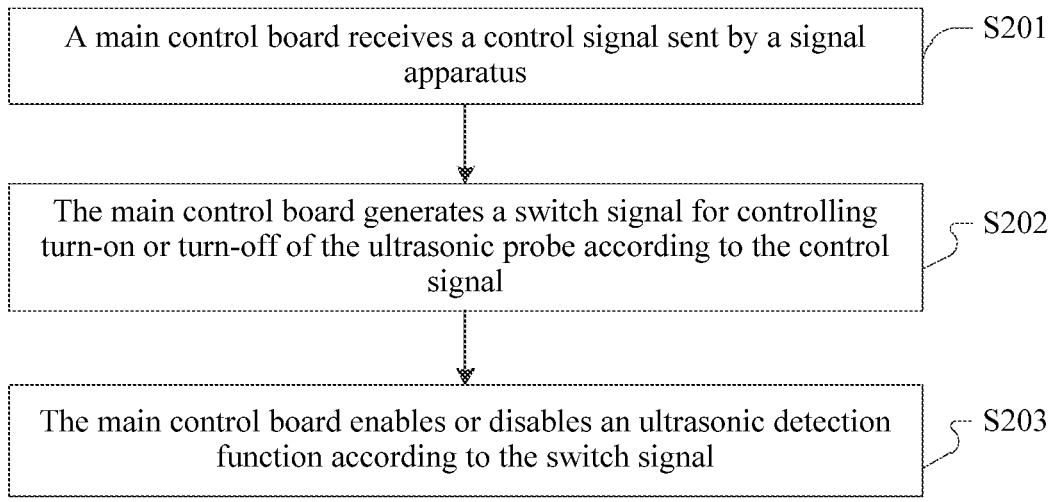
FIG. 3 is a schematic flowchart of a method for controlling an autonomous lawn mower according to an embodiment of the present invention.

FIG. 3 is a schematic flowchart of a method for controlling an autonomous lawn mower according to an embodiment of the present invention. As shown in FIG. 3, the method for controlling the autonomous lawn mower according to this embodiment specifically includes the following steps.

S201. A main control board receives a preset signal sent by a signal apparatus.

The preset signal is determined by the main control board to control enabling or disabling of an ultrasonic detection function.

A signal apparatus in this embodiment includes any one or more of the following:

a terminal wirelessly connected to the main control board, an ultrasonic probe, and an operating module or an energy module of the autonomous lawn mower.

The terminal in this embodiment may be a mobile terminal, such as a smart phone, and a tablet computer. A user performs a corresponding operation by logging in to an application program of the mobile terminal to implement remote control of the ultrasonic probe of the autonomous lawn mower. The terminal in this embodiment may also be a stationary terminal, such as a computer apparatus in a master control room. A type of the terminal is not specifically limited in this embodiment.

In addition, the terminal is wirelessly connected to the main control board of the autonomous lawn mower. A connection mode specifically includes a WIFI connection, a Bluetooth connection, and the like. A mode of the wireless connection is not specifically limited as long as the terminal can communicate with the main control board of the autonomous lawn mower.

Different types of signal apparatuses correspond to different preset signals. In one embodiment, if the signal apparatus is a terminal or an operating module, the preset signal is a manual control signal. If the signal apparatus is a terminal that is wirelessly connected to the main control board, the manual control signal is a control instruction that is sent by the terminal and that is used to turn off the ultrasonic probe. If the signal apparatus is the operating module, the manual control signal is a control instruction that is sent by the operating module and that is used to turn on or turn off the ultrasonic probe.

In one embodiment, if the signal apparatus is an ultrasonic probe or an energy module, the preset signal is an abnormal signal, the abnormal signal including a valid signal that satisfies a preset condition. The valid signal may be determined using preset strength. When an echo signal is greater than the preset strength, the echo signal is defined as a valid signal. The valid signal may also be determined using a distance or other parameters. When the autonomous lawn mower can work normally and can satisfy certain obstacle avoidance requirements, a signal that satisfies the obstacle avoidance requirements is defined as a valid signal. The preset condition may be that a time is greater than a preset time or a number is greater than a preset number, etc. When the preset condition is satisfied, the autonomous lawn mower cannot work in a specific scenario. If the signal apparatus is the ultrasonic probe, the abnormal signal is a valid signal that is received by the ultrasonic probe and that satisfies the preset condition.

In one embodiment, if the signal apparatus is the ultrasonic probe, the abnormal signal may be an echo signal indicating that a time difference between a time at which an ultrasonic wave is received and a time at which the ultrasonic wave is transmitted is less than a preset time difference. If the signal apparatus is an energy module of the autonomous lawn mower, the abnormal signal is an energy signal that is sent by the energy module and whose energy is less than preset energy.

In this embodiment, the operating module may be a touch display apparatus, and the user may select turn-on or turn-off of the ultrasonic probe through a preset touch mode on a virtual operating interface of a touch display apparatus. A specific touch mode includes click, double click, and slide, etc. The user may set the touch mode according to personal preference, which is not specifically limited in this embodiment. After the touch display apparatus receives a touch signal, a control instruction corresponding to the touch signal is sent to the main control board of the autonomous lawn mower. The operating module may also be a switch button disposed on the autonomous lawn mower, and the user can turn on or turn off the ultrasonic probe of the autonomous lawn mower through the switch button.

S202. The main control board generates a signal for controlling enabling or disabling of an ultrasonic detection function according to the preset signal.

After receiving the preset signal sent by the signal apparatus, the main control board determines enabling or disabling of the ultrasonic detection function of the autonomous lawn mower according to the preset signal.

If the preset signal instructs to enable the ultrasonic detection function, the main control board generates a switch signal 1; or if the preset signal instructs to disable the ultrasonic detection function, the main control board generates a switch signal 0.

S203. The main control board enables or disables the ultrasonic detection function according to the switch signal.

The main control board enables or disables the ultrasonic detection function according to the switch signal 1 or 0, so that the user or the autonomous lawn mower can automatically control enabling or disabling of the ultrasonic detection function in a specific working scenario. The enabling or disabling of the ultrasonic detection function may be enabling or disabling of the echo signal of the ultrasonic probe by the main control board, or may be enabling or disabling of transmitting or receiving signal by the ultrasonic probe, thereby avoiding problems such as single-package duration being shortened and the probe service life being shortened as a result of frequent turn-on of the ultrasonic probe of an existing autonomous lawn mower, or interference to normal working of the autonomous lawn mower in a special working condition.

In one embodiment, enabling and disabling of the ultrasonic detection function may be to disable receiving and transmitting functions of the ultrasonic probe, such as disabling power supply for the ultrasonic probe, or controlling the ultrasonic probe to stop working, or may be to disable processing of the ultrasonic signal by the control module.

An autonomous lawn mower equipped with the ultrasonic probe determines a distance between an obstacle and the lawn mower according to a time difference between a time at which a sound wave signal is transmitted by the ultrasonic probe and a time at which an echo signal is received by the ultrasonic probe. However, in some special cases, for example, a large lump of soil adheres to a surface of the ultrasonic probe, the sound wave signal transmitted by the ultrasonic probe is immediately reflected by the soil on the surface of the ultrasonic probe, and the lawn mower may mistakenly determine that the obstacle is very close to the lawn mower and perform a corresponding avoidance action. However, an ordinary avoidance action for avoiding an obstacle cannot remove the soil adhering to the surface of the probe, and the autonomous lawn mower keeps performing the avoidance action, resulting in abnormal working of the lawn mower or even causing damage to the lawn mower.

According to the method for controlling the autonomous lawn mower provided in this embodiment, the preset signal that is sent by the signal apparatus and received by the main control board and that is used to indicate enabling or disabling of the ultrasonic detection function generates, according to a preset signal, the switch signal for controlling turn-on or turn-off of the ultrasonic probe, and turns on or turns off the ultrasonic probe according to the switch signal. The signal apparatus includes a terminal wirelessly connected to the main control board, the ultrasonic probe, the operating module or the energy module of the autonomous lawn mower. The preset signal sent by any signal apparatus can control the ultrasonic detection function of the autonomous lawn mower, thereby avoiding problems such as single-package duration being shortened and the probe service life being shortened as a result of frequent enabling of the ultrasonic obstacle-avoidance function, and interference to normal working of the autonomous lawn mower in a special working condition.

If the signal apparatus is an ultrasonic probe, and the preset signal is the echo signal sent by the ultrasonic probe, the main control board determines, according to the echo signal, whether to turn off the ultrasonic probe of the autonomous lawn mower. If it is determined, through analysis of the echo signal, that the ultrasonic probe of the autonomous lawn mower is required to be turned off, a switch signal instructing to turn off the ultrasonic probe is generated. Therefore, the detection function of the ultrasonic probe is automatically disabled through the main control board of the autonomous lawn mower in a special working condition (such as in a heavily rainy day, or an obstacle adhering to a surface of the probe). That the signal apparatus is an ultrasonic probe is used as an example in the following embodiments to describe the control method in the present invention in detail.

Figure 4:
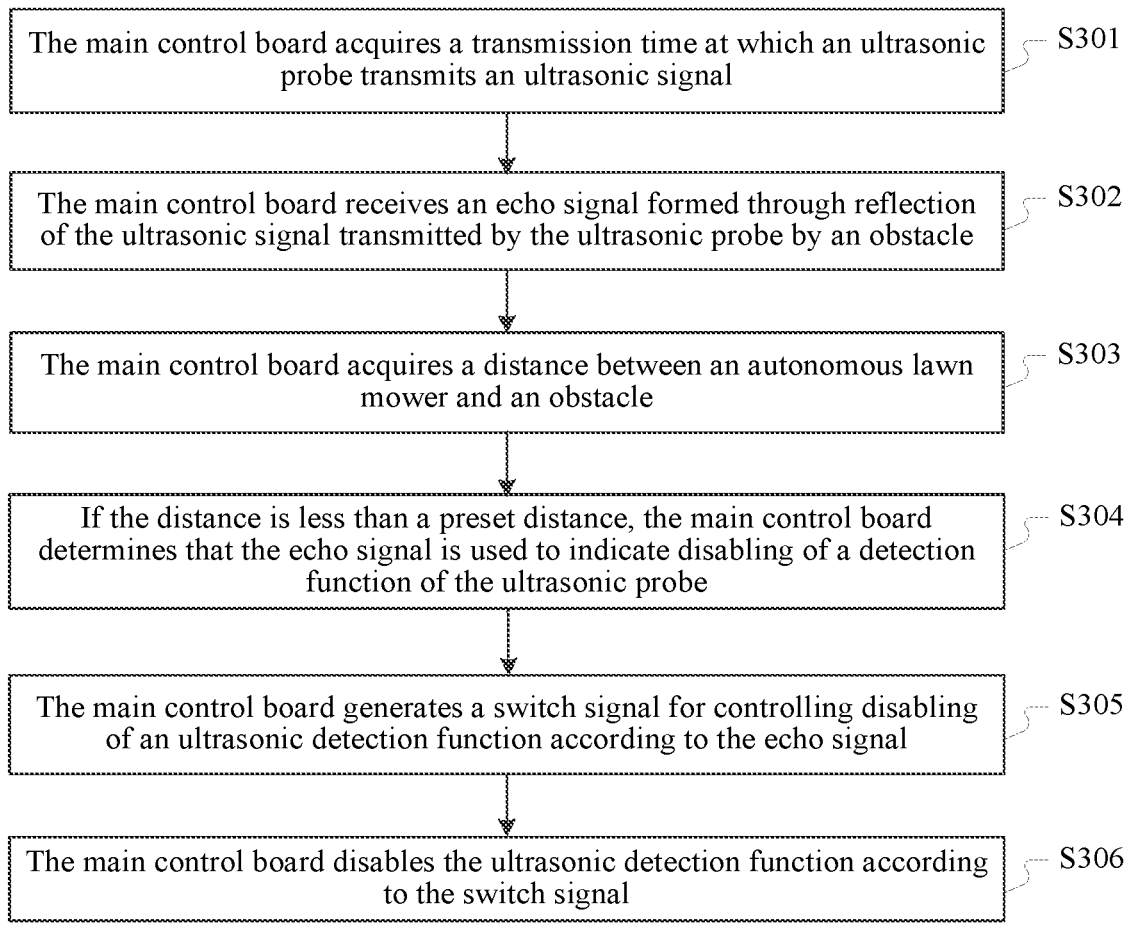
FIG. 4 is a schematic flowchart of a method for controlling an autonomous lawn mower according to an embodiment of the present invention.

FIG. 4 is a schematic flowchart of a method for controlling an autonomous lawn mower according to an embodiment of the present invention. As shown in FIG. 4, the method for controlling the autonomous lawn mower provided in this embodiment specifically includes the following steps.

S301. A main control board acquires a transmission time at which an ultrasonic probe transmits an ultrasonic signal.

It should be noted that the ultrasonic probe in this embodiment is in a turn-on state currently, and the ultrasonic probe periodically transmits the ultrasonic signal. Correspondingly, the main control board acquires the transmission time of the ultrasonic signal according to the ultrasonic signal transmitted by the ultrasonic probe.

S302. The main control board receives an echo signal formed through reflection of the ultrasonic signal transmitted by the ultrasonic probe by an obstacle.

When the ultrasonic signal encounters the obstacle within a detection range of the ultrasonic probe, the ultrasonic probe receives the echo signal formed through reflection of the ultrasonic signal by the obstacle. In this case, the ultrasonic probe transmits the echo signal to the main control board. Correspondingly, the main control board acquires a receiving time of the echo signal according to the echo signal.

S303. The main control board acquires a distance between the autonomous lawn mower and the obstacle according to the echo signal.

In particular, the main control board acquires the distance between the autonomous lawn mower and the obstacle according to the transmission time of the ultrasonic signal, the receiving time of the echo signal, and a propagation speed of the ultrasonic wave in the air.

Assuming that the transmission time of the ultrasonic signal is $t\_1$, the receiving time of the echo signal is $t\_2$, the propagation speed of the ultrasonic wave in the air is c, and the distance between the autonomous lawn mower and the obstacle is S, then S can be obtained using the following equation I:

$$S = \tfrac{1}{2}(t_2 - t_1) \cdot c \qquad \text{Equation I}$$

It should be noted that the propagation speed of ultrasonic wave in the air is influenced by an ambient temperature, and the propagation speed specifically satisfies the equation II:

$$c = 331.31\sqrt{1 + \frac{T}{273.15}} \qquad \text{Equation II}$$

c is a propagation speed (unit: m/s) of an ultrasonic wave in the air, and T is an ambient temperature (unit: K).

It can be seen that the propagation speed of the ultrasonic wave in the air varies depending on different ambient temperatures. Therefore, in order to ensure accuracy of the distance between the autonomous lawn mower and the obstacle acquired by the main control board, the autonomous lawn mower further includes a temperature sensor, the temperature sensor being connected to the main control board.

In one embodiment, before the main control board acquires the distance between the autonomous lawn mower and the obstacle according to the transmission time of the ultrasonic signal, the receiving time of the echo signal, and the propagation speed of the ultrasonic wave in the air, the method further includes:

acquiring, by the main control board, a temperature parameter of a current environment monitored by the temperature sensor; and determining, by the main control board, the propagation speed of the ultrasonic wave in the air according to the temperature parameter. The distance between the autonomous lawn mower and the obstacle that is acquired through the foregoing steps is more accurate.

S304. If the distance is less than a preset distance, the main control board determines that the echo signal is used to indicate disabling of a detection function of the ultrasonic probe.

Those skilled in the art may understand that, in a special working condition, for example, an obstacle adhering to the ultrasonic probe or in a rainy day, the ultrasonic signal transmitted by the ultrasonic probe instantly generates an echo signal when encountering the obstacle adhering to the ultrasonic probe or a rain curtain formed by rain drops, causing mistaken determining of the obstacle and affecting normal operation of the autonomous lawn mower. In order to avoid the foregoing phenomenon, the main control board determines, according to the acquired distance between the autonomous lawn mower and the obstacle, whether the distance is less than the preset distance. If the distance is less than the preset distance, the main control board determines that the echo signal is used to indicate disabling of the detection function of the ultrasonic probe.

The preset distance is set, so that a current working condition or the ultrasonic probe of the autonomous lawn mower can be monitored in real time. When it is determined that the echo signal is abnormal, S305 and S306 are performed.

S305. The main control board generates, according to the echo signal, a switch signal for controlling disabling of the ultrasonic detection function.

S306. The main control board disables the ultrasonic detection function according to the switch signal.

Implementation principles and technical effects in S305 and S306 in this embodiment are the same as those in S202 and S203 in the foregoing embodiments, and details are not described herein again.

According to the foregoing embodiments, the detection function of the ultrasonic probe is automatically disabled by the main control board of the autonomous lawn mower in a special working condition, to avoid affecting normal operation of the autonomous lawn mower as result of frequent echo signals caused by heavy rain or an obstacle adhering to the probe surface.

If the signal apparatus is the ultrasonic probe, the preset signal is an ultrasonic signal transmitted by the ultrasonic probe, and the main control board does not receive an echo signal of the ultrasonic signal within a preset time period, the main control board determines that there is no obstacle within a detectable range of the ultrasonic probe within a certain time period, and a switch signal indicating turn-off of the ultrasonic probe is generated, thereby avoiding problems such as single-package duration being shortened and the probe service life being shortened as a result of frequent enabling of the ultrasonic obstacle-avoidance function. The control method for the main control board that does not receive the echo signal within the preset time period is described in detail with reference to specific embodiments below.

Figure 5:
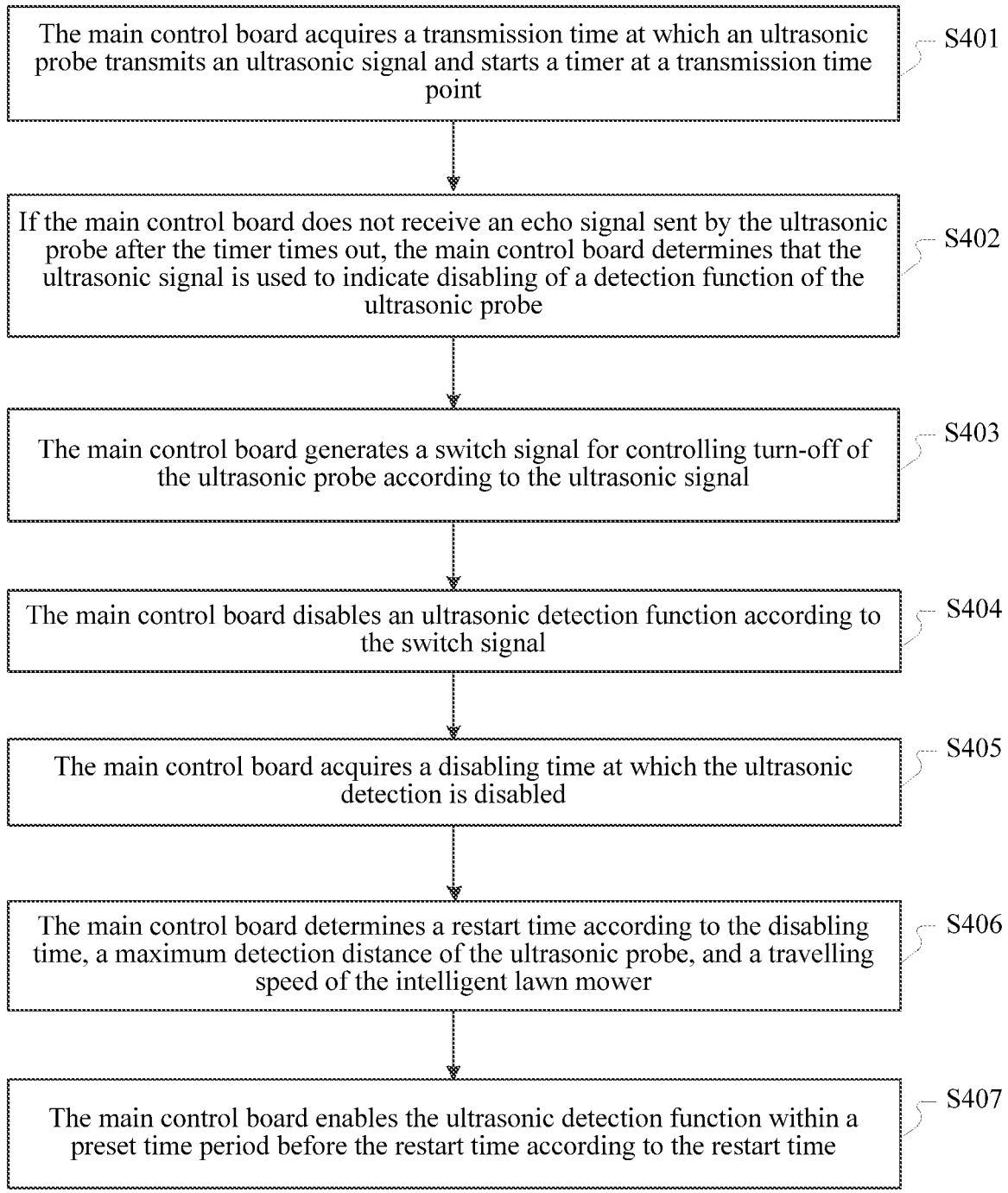
FIG. 5 is a schematic flowchart of a method for controlling an autonomous lawn mower according to an embodiment of the present invention.

FIG. 5 is a schematic flowchart of a method for controlling an autonomous lawn mower according to an embodiment of the present invention. As shown in FIG. 5, the method for controlling the autonomous lawn mower provided in this embodiment includes the following steps.

S401. A main control board acquires a transmission time of an ultrasonic signal transmitted by an ultrasonic probe and starts a timer at a transmission time point.

In this embodiment, an inherent attribute of the ultrasonic probe includes a maximum detection distance of the ultrasonic probe. Within a range of the detection distance, a receiving time at which the ultrasonic probe detects an echo signal at latest may be determined according to a propagation speed of the ultrasonic wave in the air at a normal temperature, and the main control board sets a preset duration of the timer according to the receiving time and a time at which the ultrasonic wave is transmitted.

The main control board starts the timer after acquiring a transmission time of ultrasonic signal transmitted by the ultrasonic probe. The timer is configured to indicate whether the echo signal received by the main control board times out.

If the main control board receives the echo signal sent by the ultrasonic probe before the timer times out, the main control board determines that there is an obstacle within the detection range of the ultrasonic probe. Further, the main control board determines, according to the echo signal, that a distance between the autonomous lawn mower and the obstacle is greater than a preset distance, and the main control board adjusts a walking path of the autonomous lawn mower according to the distance between the autonomous lawn mower and the obstacle, preventing damage to an interior of the autonomous lawn mower as a result of a collision between the autonomous lawn mower and the obstacle.

S402. If the main control board does not receive the echo signal sent by the ultrasonic probe after the timer times out, the main control board determines that the ultrasonic signal is used to indicate disabling of the detection function of the ultrasonic probe.

If the main control board does not receive the echo signal sent by the ultrasonic probe after the timer times out, the main control board determines there is no obstacle within the detection range of the ultrasonic probe, and the main control board may automatically turn off the ultrasonic probe of the autonomous lawn mower within a preset time period, thereby prolonging a single-package duration of the autonomous lawn mower.

S403. The main control board generates, according to the ultrasonic signal, a switch signal for controlling turn-off of the ultrasonic probe.

S404. The main control board disables the ultrasonic detection function according to the switch signal.

Implementation principles and technical effects in S403 and S404 in this embodiment are the same as those in S202 and S203 in the foregoing embodiments, and details are not described herein again.

S405. The main control board acquires a disabling time at which the ultrasonic detection function is disabled.

S406. The main control board determines a restart time according to the disabling time, a maximal detection distance of the ultrasonic probe, and a travelling speed of the autonomous lawn mower.

S407. The main control board enables the ultrasonic detection function within a preset time period before the restart time according to the restart time.

It should be noted that, within a time period from the time at which the main control board acquires the ultrasonic signal transmitted by the ultrasonic probe to the time at which the main control board turns off the ultrasonic probe after the timer times out, the autonomous lawn mower has travelled a certain distance along a preset path. Therefore, after the restart time is determined, the main control board needs to turn on the ultrasonic probe in advance within the preset time period before the restart time, so as to prevent an obstacle from existing on the path after the autonomous lawn mower travels the maximum detection distance of the ultrasonic probe, and avoid a collision because it is too late for the autonomous lawn mower to perform an avoidance action.

In the control method provided in this embodiment, if the main control board does not receive the echo signal of the ultrasonic signal within the preset time period, a switch signal instructing to turn off the ultrasonic probe is generated. The ultrasonic probe is turned off according to the switch signal, and the ultrasonic probe is turned on within the preset time period before the restart time is determined, to periodically turn on the ultrasonic probe, thereby increasing the single-package duration of the autonomous lawn mower.

If the signal apparatus is an energy module of the autonomous lawn mower, a preset signal is a low-energy signal transmitted by the energy module. The main control board generates the switch signal instructing to turn off the ultrasonic probe, thereby disabling the detection function of the ultrasonic probe when the autonomous lawn mower is in low energy, and ensuring that the autonomous lawn mower has enough prestored electric quantity for returning to a charging station. A control method for the autonomous lawn mower in a low energy working condition is described in detail with reference to specific embodiments below.

Figure 6:
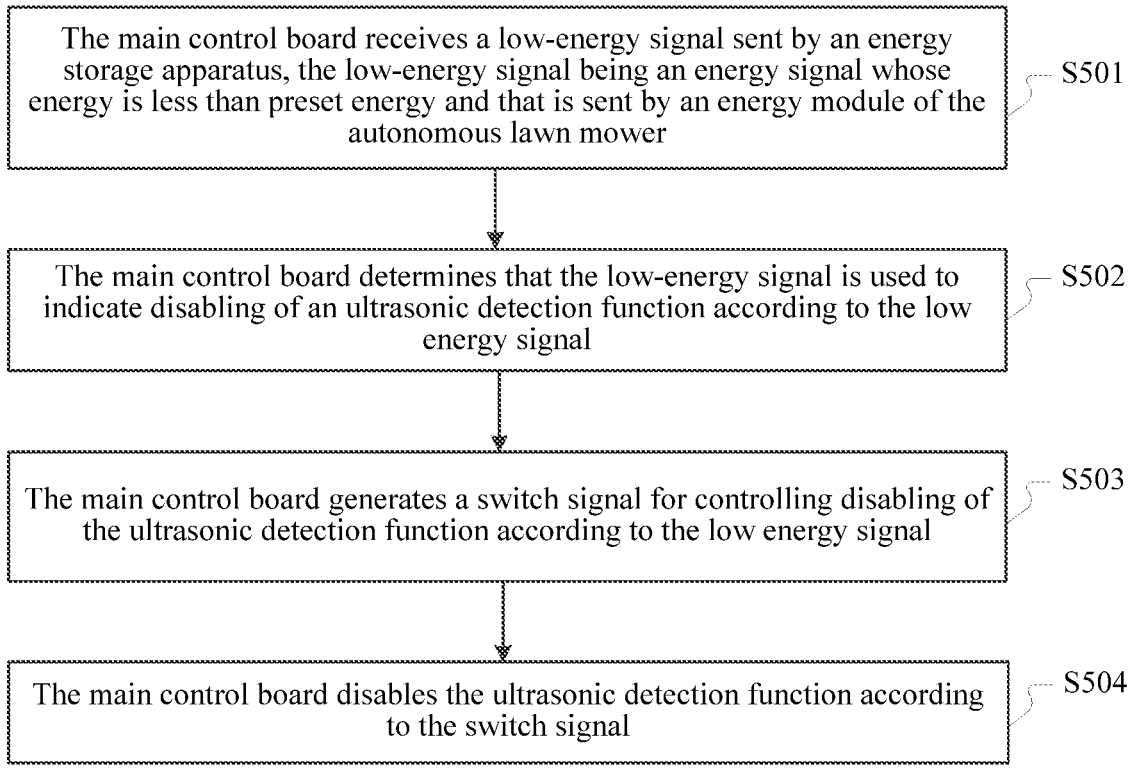
FIG. 6 is a schematic flowchart of a method for controlling an autonomous lawn mower according to an embodiment of the present invention.

FIG. 6 is a schematic flowchart of a method for controlling an autonomous lawn mower according to an embodiment of the present invention. As shown in FIG. 6, the method for controlling the autonomous lawn mower provided in this embodiment includes the following steps:

S501. A main control board receives a low-energy signal sent by an energy module, the low-energy signal being an energy signal whose energy is less than preset energy and that is sent by the energy module of the autonomous lawn mower.

S502. The main control board determines, according to the low-energy signal, that the low-energy signal is used to indicate disabling of an ultrasonic detection function.

S503. The main control board generates, according to the low-energy signal, a switch signal for controlling disabling of the ultrasonic detection function.

S504. The main control board disables the ultrasonic detection function according to the switch signal.

In particular, when the main control board receives the low-energy signal sent by the energy module of the autonomous lawn mower, the main control determines a current position of the autonomous lawn mower, generates a return path from the autonomous lawn mower to the charging station, and the main control board returns to the charging station based on the generated return path according to a walking system for controlling the autonomous lawn mower.

In this embodiment, when the main control board returns to the charging station based on a determined return path after receiving the low-energy signal sent by the energy module, if the detection function of the ultrasonic probe is still enabled, the main control board may mistakenly determines the charging station as an obstacle on the return path according to an echo signal returned by the charging station. Consequently, the autonomous lawn mower cannot automatically return to the charging station for charging.

According to the foregoing control method, the main control board generates, according to the received low-energy signal, a switch signal for indicating turn-off of the ultrasonic probe, and turns off the ultrasonic probe according to the switch signal, preventing a problem that the autonomous lawn mower cannot return to the charging station for charging, and ensuring that the autonomous lawn mower has enough prestored electric quantity to return to the charging station.

Figure 7:
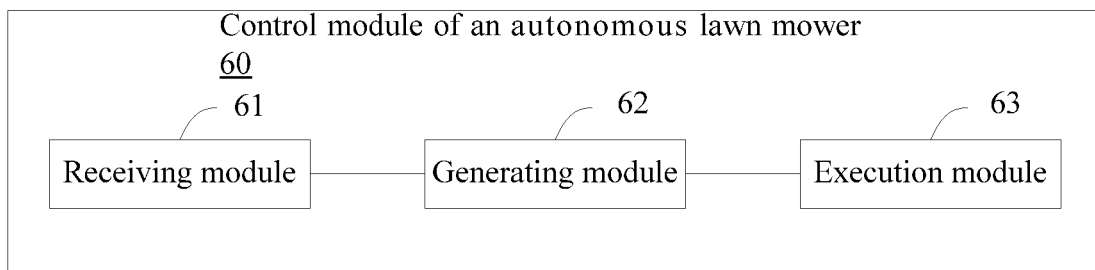
FIG. 7 is a schematic structural diagram of a control module of an autonomous lawn mower according to an embodiment of the present invention.

FIG. 7 is a schematic structural diagram of a control module of an autonomous lawn mower according to an embodiment of the present invention. As shown in FIG. 7, a control module 60 of the autonomous lawn mower in this embodiment includes:

a receiving module 61 configured to receive a preset signal sent by a signal apparatus, the preset signal being used to instruct to enable or disable a detection function of the ultrasonic probe, and the signal apparatus including any of the following: a terminal wirelessly connected to the main control board, an ultrasonic probe, an operating module, or an energy module of the autonomous lawn mower;

a generating module 62 configured to generate, according to the preset signal, a switch signal for controlling turn-on or turn-off of the ultrasonic probe; and an execution module 63 configured to enable or disable the detection function of the ultrasonic probe according to the switch signal.

The control module of the autonomous lawn mower provided in an embodiment of the present invention may be configured to perform the method performed by the main control board in the foregoing method embodiment with similar implementation principles and technical effects, and details are not described herein again.

Figure 8:
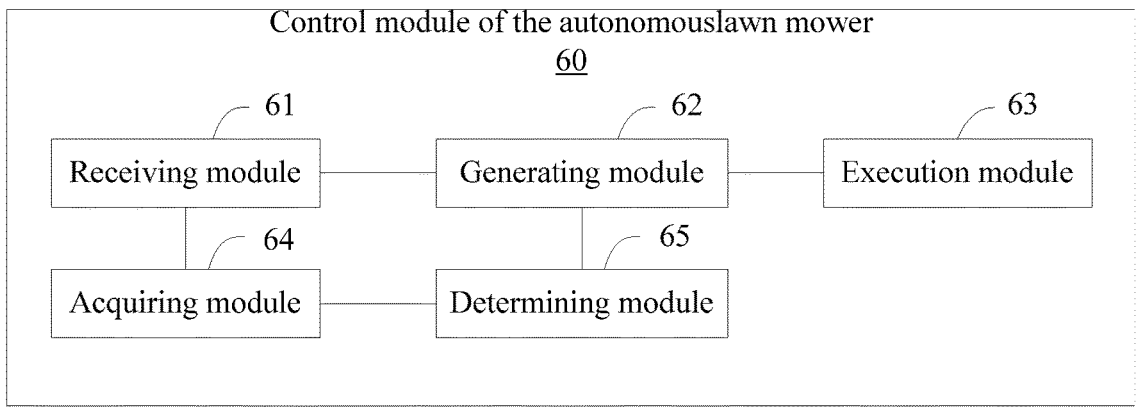
FIG. 8 is a schematic structural diagram of a control module of an autonomous lawn mower according to an embodiment of the present invention.

FIG. 8 is a schematic structural diagram of a control module of an autonomous lawn mower according to an embodiment of the present invention. As shown in FIG. 8, if a signal apparatus is an ultrasonic probe, a preset signal is an echo signal sent by the ultrasonic probe. A receiving module is specifically configured to receive an echo signal formed through reflection of an ultrasonic signal sent by the ultrasonic probe by an obstacle.

A control module 60 further includes: an acquiring module 64 configured to acquire a distance between the autonomous lawn mower and the obstacle according to the echo signal; and a determining module 65 configured to determine that the echo signal is used to indicate disabling of a detection function of the ultrasonic probe if the distance is less than a preset distance.

In one embodiment, the acquiring module 64 is further configured to acquire a transmission time at which the ultrasonic probe transmits an ultrasonic signal; and acquire a distance between the autonomous lawn mower and an obstacle according to the transmission time, a receiving time of an echo signal, and a propagation speed of an ultrasonic wave in the air.

In one embodiment, the autonomous lawn mower further includes a temperature sensor, the temperature sensor being connected to the main control board. The acquiring module 64 is further configured to:

acquire a temperature parameter of a current environment monitored by the temperature sensor.

The determining module 65 is further configured to determine the propagation speed of the ultrasonic wave in the air according to the temperature parameter.

In one embodiment, if the signal apparatus is the ultrasonic probe, the preset signal is an ultrasonic signal transmitted by the ultrasonic probe. The acquiring module 64 is specifically configured to:

acquire a transmission time of the ultrasonic signal transmitted by the ultrasonic probe.

The execution module 63 is further configured to start a timer at a transmission time point.

The determining module 65 is further configured to determine that the ultrasonic signal is used to indicate disabling of the detection function of the ultrasonic probe if the main control board does not receive the echo signal sent by the ultrasonic probe after the timer times out.

In one embodiment, the acquiring module 64 is further configured to acquire a turn-off time at which the ultrasonic probe is turned off.

The determining module 65 is further configured to determine a restart time according to the turn-off time, a maximum detection distance of the ultrasonic probe, and a travelling speed of the autonomous lawn mower.

The performing module 63 is further configured to turn on the ultrasonic probe within a preset time period before the restart time according to the restart time.

In one embodiment, a signal apparatus is an energy module of the autonomous lawn mower, and a preset signal is a low-energy signal sent by the energy module. The acquiring module 64 is specifically configured to:

acquire the low-energy signal sent by the energy module, the low-energy signal being a signal sent by the energy module when a current electric quantity of the autonomous lawn mower is less than a preset electric quantity.

The determining module 65 is further configured to determine, according to the low-energy signal, that the low-energy signal is configured to indicate disabling of the detection function of the ultrasonic probe.

The control module of the autonomous lawn mower provided in an embodiment of the present invention may be configured to perform the method performed by the main control board in the foregoing method embodiment with similar implementation principles and technical effects, and details are not described herein again.

Figure 9:
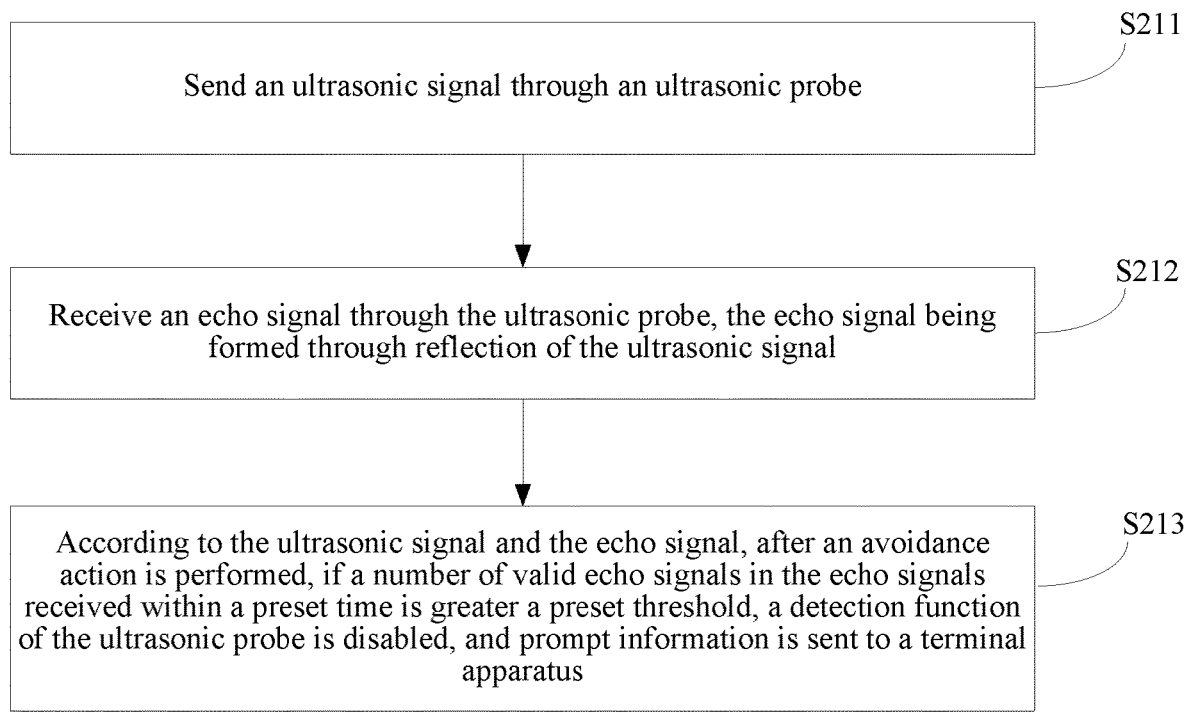
FIG. 9 is a flowchart of a method for controlling an autonomous lawn mower according to an embodiment of the present invention.

FIG. 9 is a flowchart of a method for controlling an autonomous lawn mower according to an embodiment of the present invention. As shown in FIG. 9, the method for controlling the autonomous lawn mower provided in this embodiment may include the following steps.

Step S511: An ultrasonic signal is transmitted through an ultrasonic probe.

The ultrasonic probe of the autonomous lawn mower equipped with an ultrasonic obstacle-avoidance system periodically transmits the ultrasonic signal under the control of a main control board.

Step S512: An echo signal is received through the ultrasonic probe, the echo signal being formed through reflection of the ultrasonic signal.

When the ultrasonic signal encounters an obstacle within a detection range of the ultrasonic probe, the ultrasonic probe receives the echo signal formed through reflection of the ultrasonic signal by the obstacle. A distance between the obstacle and the autonomous lawn mower may be determined according to the transmitted ultrasonic signal and the received echo signal. When the distance between the obstacle and the autonomous lawn mower is less than a preset distance, for example, is less than 15 cm, an avoidance operation may be performed to avoid the obstacle, preventing negative effects caused by a collision between the autonomous lawn mower and the obstacle.

In particular, the distance between the autonomous lawn mower and the obstacle may be determined according to a transmission time of the ultrasonic signal, a receiving time of the echo signal, and a propagation speed of the ultrasonic wave in the air.

In a possible condition, when there are some tall weeds or weeds with relatively large branch diameters in a lawn, such as dandelions, the autonomous lawn mower may also determine the weeds as obstacles, and performs an avoidance operation when the distance is less than the preset distance. However, in this case, there is no need to perform the avoidance operation. Therefore, in order to reduce unnecessary avoidance and improve obstacle avoidance efficiency, after it is determined that the distance between the obstacle and the autonomous lawn mower is less than the preset distance, strength of the received echo signal is further determined. The avoidance operation is performed to avoid the obstacle only when the strength of the echo signal is greater than preset strength. An echo signal formed through reflection by weeds is generally relatively weak, and an echo signal formed through reflection by obstacles such as a large stump and a stone sculpture that really need to be avoided are relatively strong. Therefore, increased determinations as to strength of the echo signal can improve obstacle avoidance efficiency of the autonomous lawn mower.

The autonomous lawn mower performs the avoidance operation in many alternative ways such as through moving backward, turning, bypassing, or replanning a travelling path, which is not specially limited in this embodiment.

Step S513: After the avoidance operation is performed according to the ultrasonic signal and the echo signal, if a number of valid signals in echo signals received within a preset time is greater than a preset threshold, or a time at which the valid signals are received is greater than a preset time, an action of terminating the avoidance operation is performed, the valid signals being used as echo signals for the autonomous lawn mower to perform the avoidance operation.

In some special working conditions, for example, when a large lump of soil adheres to the ultrasonic probe or in a heavily rainy day, the ultrasonic signal transmitted by the ultrasonic probe is instantly reflected when encountering the large lump of soil adhering to the ultrasonic probe or a rain curtain formed by rain drops, and the autonomous lawn mower may mistakenly determine that the obstacle is very close to the autonomous lawn mower and performs a corresponding avoidance action. The autonomous lawn mower continually receives an echo signal formed through reflection by the soil or the rain curtain, thereby continually performing the avoidance action. Consequently, the autonomous lawn mower cannot work normally, for example, the autonomous lawn mower spins in situ as a result of continual avoidance, even causing damage to the machine. Similarly, if a user does not mow for a long time because of going out, etc., and heights of tall grass within a working area of the autonomous lawn mower within a detection range of the ultrasonic probe, the autonomous lawn mower may continuously detect an echo signal formed through reflection by the tall grass, thereby continually performing the avoidance action and consequently, the autonomous lawn mower cannot work normally. That is, in a special working condition, the autonomous lawn mower may continually receive an echo signal of high strength and continually perform the avoidance operation, and therefore the autonomous lawn mower cannot work normally and becomes abnormal.

In this embodiment, in order to prevent the foregoing cases from occurring, a number of valid signals received within the preset time is counted, or a time at which the valid signals are received is counted. Signal strength of the valid signals is greater than the preset strength. The valid signals may be used to determine a relationship between a distance from an obstacle to the autonomous lawn mower and the preset distance. The autonomous lawn mower may be controlled, according to the valid signals, to perform or not to perform the avoidance operation.

If the number of the valid signals received within the preset time is greater than the preset threshold, or the time at which the valid signals are received is greater than the preset time, an action of terminating the avoidance operation is performed to terminate unnecessary avoidance in time. When the autonomous lawn mower works normally, the autonomous lawn mower successfully avoids an obstacle after receiving a valid signal and performing an obstacle operation, and then will not receive the valid signal. When a large lump of soil adheres to the ultrasonic probe, the autonomous lawn mower receives the valid signal and performs the avoidance operation. However, the avoidance operation for avoiding an obstacle cannot be used to avoid an obstacle in a special working condition. Therefore, even though the avoidance operation is performed, the autonomous lawn mower still receives a valid echo signal, continues to perform the avoidance operation, then becomes abnormal, and cannot work normally. Through counting the number of valid signals received within the preset time or through counting the time at which the valid signals are received, it may be determined whether an abnormal condition occurs.

It should be noted that the preset time and the preset threshold in this embodiment need to be set according to an actual situation, and values required to be set may vary depending on different models of the autonomous lawn mower. When the preset time and the preset threshold are determined, a frequency at which the ultrasonic probe of the autonomous lawn mower transmits an ultrasonic wave and the time required by the autonomous lawn mower to perform the avoidance operation need to be considered.

The avoidance operation can be terminated in many alternative ways such as disabling the ultrasonic detection function, or disabling an avoidance system of the autonomous lawn mower, which is not limited in this embodiment.

According to the method for controlling the autonomous lawn mower provided in this embodiment, an echo signal formed through reflection of the ultrasonic signal transmitted by the ultrasonic probe is received, and it is determined, according to the transmitted ultrasonic signal and the echo signal, whether to perform the avoidance operation, so that the autonomous lawn mower can avoid the obstacle effectively, and determines whether a number of valid signals received within the preset time is greater than the preset threshold. When the number of valid signals is greater than the preset threshold, the action of terminating the avoidance operation is performed, thereby terminating unnecessary avoidance in time and improving stability and reliability of the autonomous lawn mower during working.

In one embodiment, the disabling the ultrasonic detection function may include: disabling the detection function of the ultrasonic probe.

In one embodiment, the disabling the ultrasonic detection function may also include: disconnecting a power supply switch of the ultrasonic probe without supplying power to the ultrasonic probe. In this case, due to neither transmitting a signal nor receiving a signal, the ultrasonic probe will not receive a valid signal, and the autonomous lawn mower does not perform the avoidance operation and returns to be a normal working state. Such method may further be used to reduce power consumption of the autonomous lawn mower and prolong service life of the ultrasonic probe.

In one embodiment, the disabling the ultrasonic detection function may also include: not responding to the valid signal received by the ultrasonic probe. In other words, if the number of valid signals received within the preset time is greater than the preset threshold, or a time at which the valid signals are received is greater than the preset time, even though the valid signals are received, the echo signal is not be further processed or analyzed.

It should be noted that after the avoidance operation is terminated in a manner of disabling the detection function of the ultrasonic probe provided in this embodiment, the autonomous lawn mower may further continue mowing. In one embodiment, a mechanical obstacle-avoidance system may be further used to avoid an obstacle.

In one embodiment, the performing the action of terminating the avoidance operation may include: disabling a walking system for the autonomous lawn mower to move forward, move backward, or turn in the autonomous lawn mower. Because the autonomous lawn mower performs the avoidance operation depending on its walking system, the avoidance operation cannot be naturally performed after the walking system is disabled. Therefore, failures such as shutdown and damage to the walking system due to continually performing the avoidance operation are prevented.

The autonomous lawn mower is generally used outdoors with a complex and changeable working environment. For example, the lawn after the rain is wet and slippery, some lawns have steep slopes, and some lawns are not flat enough with pits. For example, if there is an obstacle that needs to be avoided within a range over which a distance from the obstacle to the autonomous lawn mower is less than a preset distance, the autonomous lawn mower performs an avoidance operation after receiving a valid signal. However, slipping may be caused in the walking system due to slippery, or the autonomous lawn mower fails to perform the avoidance operation as a result of being caught into the potholes in the lawn. In this case, the autonomous lawn mower may also continually receive valid echo signals, that is, the number of valid signals received within the preset time may be greater than the preset threshold. In this case, a cutting system of the autonomous lawn mower is always in a working state, which may bring some unexpected consequences, for example, damage to a blade in the cutting system, certain damage to the obstacle, and the like. Therefore, in order to further improve safety of the autonomous lawn mower during working, on the basis of any of the foregoing embodiments, the method for controlling the autonomous lawn mower provided in this embodiment may further include: disabling the cutting system for cutting grass in the autonomous lawn mower when the number of valid signals received within the preset time is greater than the preset threshold, or when the time at which valid signals is received is greater than the preset time.

On the basis of any of the foregoing embodiments, the method provided in this embodiment may further include: outputting alarm information through a speaker and/or a indicator light if the number of the valid signals in the echo signals received within the preset time is greater than the preset threshold or if the time at which valid signals are received is greater than the preset time, the alarm information being used to indicate that the autonomous lawn mower is abnormal.

In one embodiment, an alarm sound may be sent through the speaker as a prompt, or preset voice information may be played through the speaker as a prompt, for example, "主人，我需要帮助 (Master, I need help)" may be played to ask the user for help. Specific content of the alarm sound and the voice information is not limited in this embodiment, which may be set according to actual needs.

In one embodiment, alarm information may be further output through an indicator light in the autonomous lawn mower, and a specific installation position of the indicator light in the autonomous lawn mower is not limited in this embodiment. For example, the indicator light may be installed on an operating interface of the autonomous lawn mower, or may be installed on a housing of the autonomous lawn mower. Prompting may be performed through flashing or a constantly lit indicator light. Further, an urgency degree of a condition may also be indicated through a color of the indicator light. For example, red represents an emergency, and yellow represents a normal condition.

Regardless of which way is used for prompting, the purpose is to enable the user to perform human intervention as soon as possible and thoroughly eliminate a cause of causing an abnormal condition.

On the basis of any of the foregoing embodiments, the method provided in this embodiment may further include: sending prompt information to a terminal if the number of valid signals in the echo signals received within the preset time is greater than the preset threshold or if the time at which the valid signals are received is greater than the preset time, the prompt information being used to indicate that the autonomous lawn mower is abnormal and the terminal apparatus is connected to the autonomous lawn mower in a wireless connection manner.

With the continuous development of the Internet of Things technologies, a manner in which an autonomous appliance is controller through a terminal apparatus has been widely used. In this embodiment, the terminal apparatus may be used to control an autonomous lawn mower, and a working state of the autonomous lawn mower may be checked. When the autonomous lawn mower is abnormal, prompt information may be sent to the terminal apparatus to remind the user. The user may perform human intervention in time to thoroughly eliminate the cause of an abnormal condition after receiving the prompt information. For example, the user may clear soil adhering to an ultrasonic probe away, so that the autonomous lawn mower may restore automatic obstacle avoidance. The user may remove the autonomous lawn mower from a pothole in a lawn to enable the autonomous lawn mower to continue working normally.

The terminal apparatus in this embodiment may be a mobile terminal, for example, a smart phone, a tablet computer, etc. The terminal in this embodiment may also be a fixed terminal, for example, a computer apparatus in a main control room. The terminal apparatus is not specifically limited in this embodiment. In addition, the wireless connection manner between the terminal apparatus and the autonomous lawn mower may be a WIFI connection, a Bluetooth connection, or a cellular mobile communication network may be used. The wireless connection manner is not specifically limited in this embodiment as long as the terminal apparatus can communicate with the autonomous lawn mower.

Figure 10:
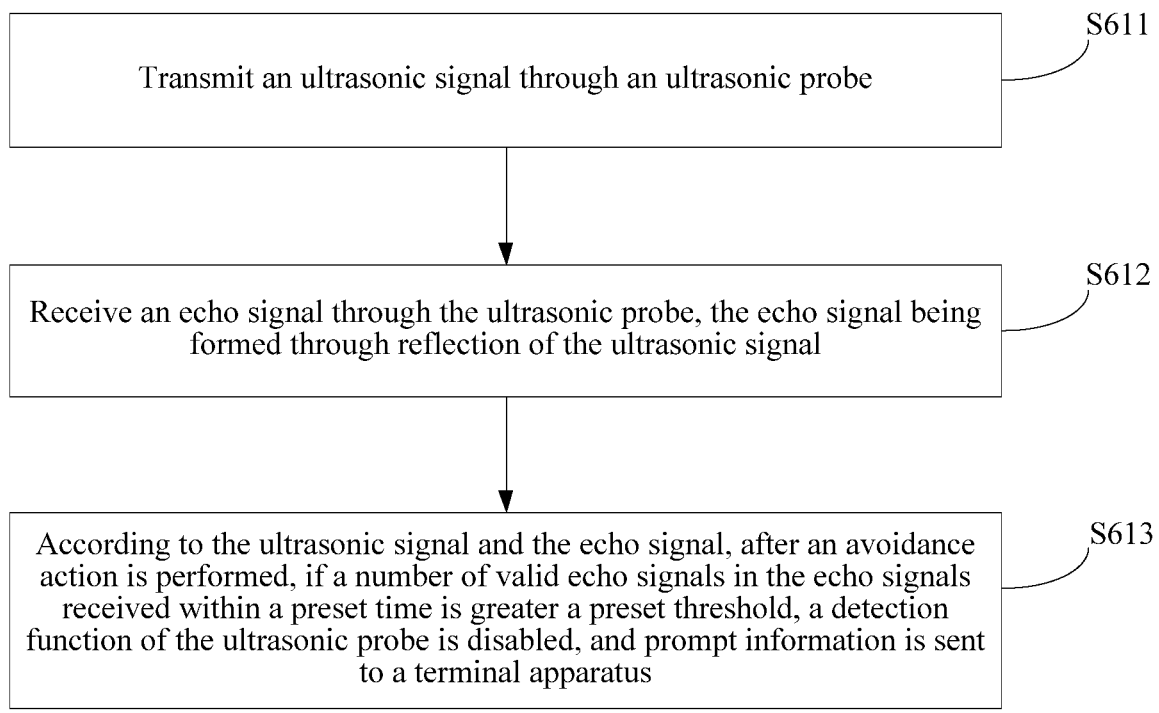
FIG. 10 is a flowchart of a method for controlling an autonomous lawn mower according to an embodiment of the present invention.

On the basis of the foregoing embodiments, the foregoing embodiments are combined in this embodiment. Referring to FIG. 10, only FIG. 10 is used as an example in the embodiments of the present invention, which does not indicate that the present invention is not limited thereto. FIG. 10 is a flowchart of another embodiment of a method for controlling an autonomous lawn mower according to the present invention. As shown in FIG. 10, the method for controlling the autonomous lawn mower provided in this embodiment may include the following steps:

Step S611: An ultrasonic signal is transmitted through an ultrasonic probe.

Step S612: An echo signal is received through the ultrasonic probe, the echo signal being formed through reflection of the ultrasonic signal.

Step S613: According to the ultrasonic signal and the echo signal, after an avoidance operation is performed, if a number of valid signals in echo signals received within a preset time is greater than a preset threshold, or if a time at which the valid signals are received is greater than a preset time, a detection function of the ultrasonic probe is disabled, and prompt information is sent to a terminal apparatus.

According to the method for controlling the autonomous lawn mower provided in this embodiment, it is determined whether the avoidance operation is performed according to the transmitted ultrasonic signal and the echo signal, so as to effectively avoid an obstacle and prevent a collision. When a number of valid signals received within the preset time is greater than the preset threshold, or when the time at which the valid signals are received is greater than the preset time, the detection function of the ultrasonic probe is disabled, preventing the autonomous lawn mower from being caught in the endlessly cyclic avoidance operation, so that the autonomous lawn mower can work normally. When the number of the valid signals received within the preset time is greater than the preset threshold, prompt signal is sent to the terminal apparatus wirelessly connected to the autonomous lawn mower for prompting, so as to remind the user of performing human intervention to thoroughly eliminate a cause of an abnormal condition. According to the method for controlling the autonomous lawn mower provided in this embodiment, stability and reliability of the autonomous lawn mower during working are improved.

A control module of an autonomous lawn mower is further provided in an embodiment of the present invention. After an avoidance operation is performed according to an ultrasonic signal and an echo signal, if a number of valid signals in echo signals received within a preset time is greater than a preset threshold, or if a time at which the valid signals are received is greater than a preset time, an action of terminating the avoidance operation is performed, the valid signals being used as the echo signals for the autonomous lawn mower to perform the avoidance operation.

In one embodiment, the ultrasonic probe is an ultrasonic probe that is separately transmitted or separately received, that is, a design with transmitting separated from receiving, and a transmitting module and a receiving module are two independent modules. In another embodiment, the ultrasonic probe is an ultrasonic probe integrated with transmitting and receiving. Therefore, the transmitting module and the receiving module are actually a same module, that is, a same module implements function of both transmitting and receiving.

A device in this embodiment may be configured to implement the technical solutions of the foregoing method embodiment with similar implementation principles and technical effects, and details are not described herein again.

In one embodiment, the control module is specifically configured to: disable a detection function of the ultrasonic probe to terminate an avoidance operation if a number of valid signals in the echo signals received within a preset time is greater than a preset threshold, or if a time at which the valid signals are received is greater than a preset time.

In one embodiment, the control module is specifically configured to: disable a walking system for the autonomous lawn mower to move forward, move backward, or turn to terminate the avoidance operation if the number of the valid signals in the echo signals received within the preset time is greater than the preset threshold or if the time at which the valid signals are received is greater than the preset time.

In one embodiment, the control module is specifically configured to: disable a cutting system for cutting grass in the autonomous lawn mower if the number of the valid signals in the echo signals received within the preset time is greater than the preset threshold or if the time at which the valid signals are received is greater than the preset time.

In one embodiment, the control module of the autonomous lawn mower may include a prompt module. The prompt module is specifically configured to: output alarm information through a speaker and/or an indicator light if the number of the valid signals in the echo signals received within the preset time is greater than the preset threshold or if the time at which the valid signals are received is greater than the preset time, the alarm information being used to indicate that the autonomous lawn mower is abnormal.

In one embodiment, the prompt module may be further configured to: send prompt information to a terminal apparatus if the number of the valid signals in the echo signals received within the preset time is greater than the preset threshold or if the time at which the valid signals are received is greater than the preset time, the prompt information being used to indicate that the autonomous lawn mower is abnormal, and the terminal apparatus being connected to the autonomous lawn mower in a wireless connection manner.

Figure 11:
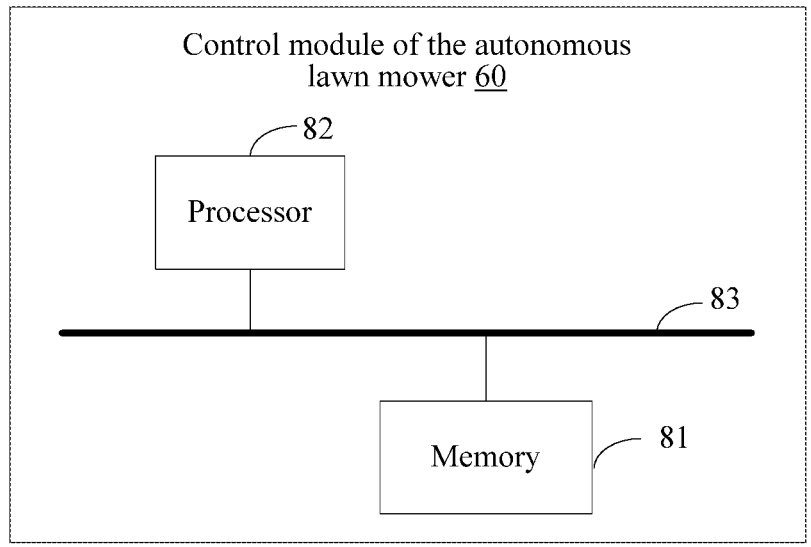
FIG. 11 is a schematic structural diagram of a control module of an autonomous lawn mower according to an embodiment of the present invention.

FIG. 11 is a schematic structural diagram of a control module of an autonomous lawn mower according to an embodiment of the present invention. As shown in FIG. 11, a control module 60 of the autonomous lawn mower provided in this embodiment includes:

a memory 81; a processor 82; and a computer program.

The computer program is stored in the memory 81, and the processor 82 is configured to perform the method in any of the foregoing embodiments, to control enabling or disabling of a detection function of an ultrasound probe.

In one embodiment, the memory 81 may be either independent, or may be integrated with the processor 82.

When the memory 81 is a device independent of the processor 82, the control module 60 may further include:

a bus 83 configured to connect the memory 81 and the processor 82.

The autonomous lawn mower has an obstacle-avoidance function. One way is to give way using a collision sensor through a collision between the autonomous lawn mower and an obstacle. However, the collision may result in damage to obstacles (flowers, bushes, etc.), and a long-term collision may cause damage to the autonomous lawn mower. The other way is to avoid or bypass in advance using an ultrasonic sensor to detect an obstacle such as a tree when the autonomous lawn mower approaches the obstacle, so as to prevent a collision with the obstacle. However, because angles at which the ultrasonic sensor performs transmitting and receiving in a vertical direction usually cannot cover the ground, the ultrasonic sensor cannot recognize the obstacle having a relatively short height.

In the embodiment of the present invention, the autonomous lawn mower is used as an example to describe the self-moving apparatus and the method controlling same. The automatic walking apparatus mentioned in the embodiment may be understood as a self-moving apparatus.

Figure 12:
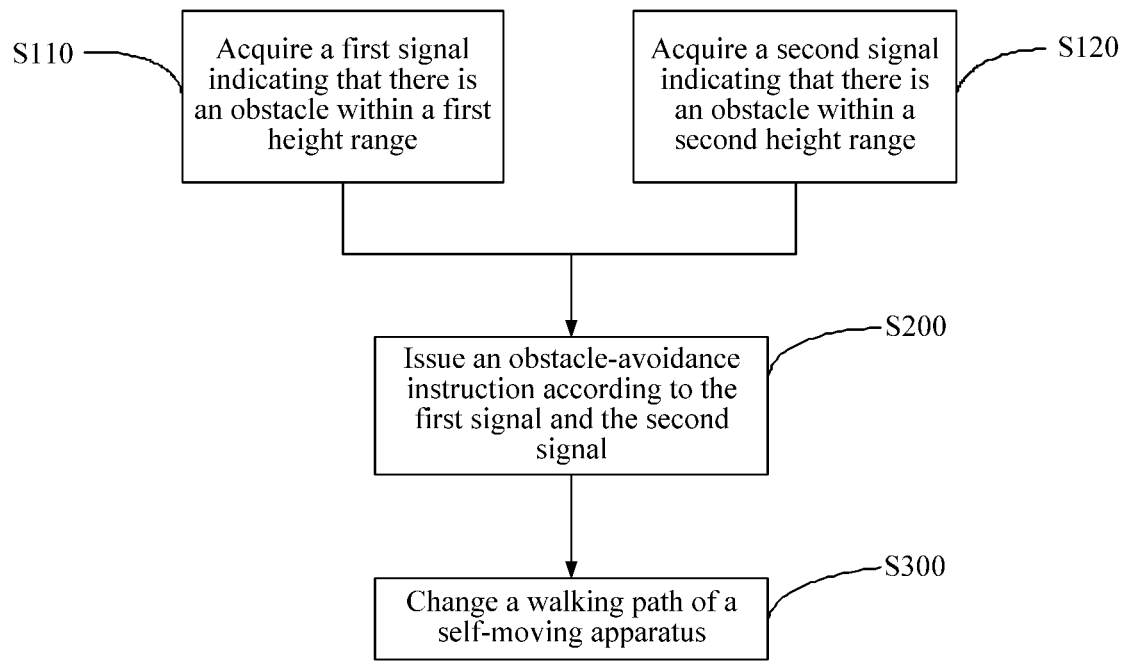
FIG. 12 is a flowchart of a method for avoiding an obstacle by an autonomous lawn mower in an embodiment according to the present invention.

Referring to FIG. 12, in one embodiment, a method for avoiding an obstacle by an autonomous lawn mower includes the following steps.

S110: A first signal indicating that there is an obstacle within a first height range is acquired.

An object defined as an obstacle can prevent the autonomous lawn mower from walking, and therefore it is necessary to change a walking path of the autonomous lawn mower to avoid the obstacle.

Figure 18:
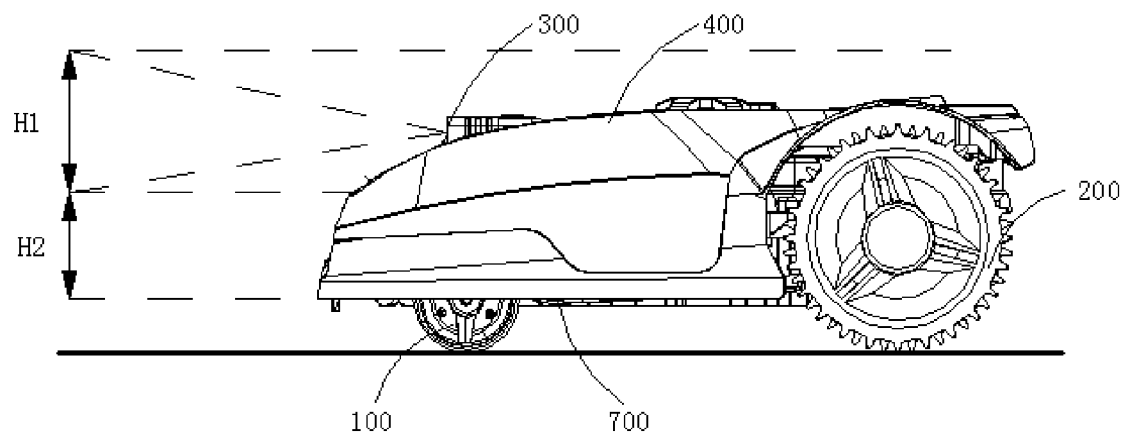
FIG. 18 is a schematic diagram of an autonomous lawn mower and a working scenario thereof in an embodiment according to the present invention.

In one embodiment, referring to FIG. 18, the autonomous lawn mower is equipped with an ultrasonic probe, the ultrasonic probe being provided with a transmitting device and a receiving device. The autonomous lawn mower mows on a lawn, and the ultrasonic transmitting device transmits an ultrasonic wave toward a travelling direction of the autonomous lawn mower. The ultrasonic wave propagates in the air and is instantly reflected by an obstacle on the way, and the ultrasonic receiving device receives a reflection wave. The reflection wave is defined as a first signal. Because the ultrasonic wave has strong directivity and propagates a long distance in a medium, the ultrasonic wave may be used for distance measurement.

The ultrasonic probe is installed on a floating cover of the autonomous lawn mower and located at a certain height from the ground, which may be used to detect relatively big obstacles, such as trunks and chairs. A detection range of the ultrasonic wave is a first height (H1) range. When there is an obstacle within the first height (H1) range, the receiving device receives, through characteristics of the ultrasonic wave, the ultrasonic signal reflected by the obstacle. After processing and calculation, the autonomous lawn mower is controlled to perform an avoidance action at a position with a certain distance from the obstacle, further avoiding the collision between the obstacle and the autonomous lawn mower.

S120: A second signal indicating that there is an obstacle within a second height range is acquired.

In one embodiment, referring to FIG. 18, there is an obstacle within a second height (H2) range in a mowing environment of the autonomous lawn mower, for example, bushes, flowers, and the like. For obstacles existing within the second height (H2) range and beyond a height range detected by the ultrasonic probe, the autonomous lawn mower is provided with a magnetic block and a Hall element for sensing the magnetic block to detect the obstacles.

The magnetic block is fixed inside the housing of the autonomous lawn mower. The Hall element is distributed within a magnetic field range of the magnetic block for determining whether the magnetic block moves by detecting a change in the magnetic strength. A displacement signal of the magnetic block is defined as a second signal.

In a word, after the autonomous lawn mower collides with an obstacle within the second height range, the housing deforms to some extent due to the collision, and the magnetic block is displaced relative to the Hall sensor with the deformation of the housing. The magnetic field of the magnetic block changes due to the position change, and the Hall sensor detects the displacement of the magnetic block, thereby detecting that the autonomous lawn mower collides with an obstacle, and further controlling the autonomous lawn mower to turn or move backward.

S200: An obstacle-avoidance instruction is issued according to the first signal and the second signal.

The ultrasonic signal reflected by the obstacle within the first height range is defined as the first signal in the foregoing description. The autonomous lawn mower collides with the obstacle within the second height range, the magnetic block disposed on the housing of the autonomous lawn mower is displaced, and a displacement signal is the second signal.

Further, a minimum value within the first height range is set to be not greater than a maximum value within a second height range, and there is no gap and there is even an overlapping portion between the first height range and the second height range. Then, in a working environment of the autonomous lawn mower, a height of an obstacle substantially covers the first height range and the second height range. Within the first height range covered by the ultrasonic wave, the obstacle is detected using characteristics of the ultrasonic wave, and the first signal is acquired. At a location with a certain distance from the obstacle, the autonomous lawn mower is controlled to perform an avoidance action. Within the second range that the ultrasonic wave cannot cover, the obstacle is detected through collision contact, the second signal is acquired, and the autonomous lawn mower is controlled to turn or move backward. In this way, obstacles within different height ranges may be detected using the foregoing obstacle avoidance methods, and different obstacle avoidance means may be further used.

In summary, according to the first signal and the second signal, two obstacle avoidance means are combined to detect obstacles within different height ranges and determine whether the autonomous lawn mower encounters the obstacle. When working in a complex environment such as flowers, trunks, and bushes, the autonomous lawn mower performs the avoidance action to be adapted to the complex working environment, and safety of the autonomous lawn mower is improved.

S300: A walking path of the autonomous lawn mower is changed according to an obstacle-avoidance instruction.

According to the first signal and the second signal, the autonomous lawn mower issues the obstacle avoidance instruction to control movement of the autonomous lawn mower. For example, at a location with a certain distance from the autonomous lawn mower, there is an obstacle within the first height (H1) range, a transmission signal of the ultrasonic wave is detected, and an obstacle-avoidance instruction for turning is issued to control the autonomous lawn mower to turn.

Figure 13:
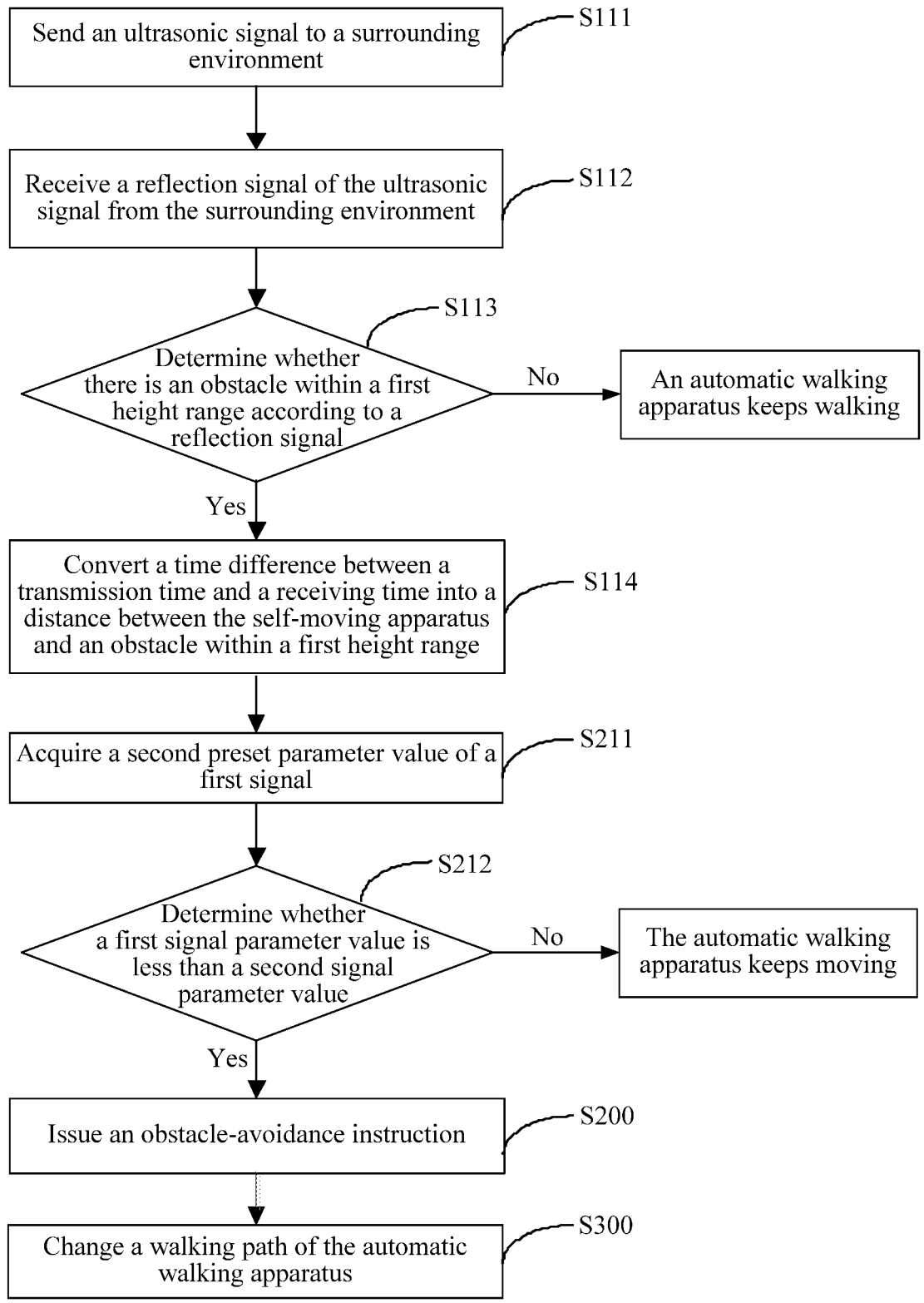
FIG. 13 is a flowchart of a method for avoiding an obstacle by an autonomous lawn mower in a preferred embodiment according to the present invention.

Further, referring to FIG. 13, in one embodiment, a method for avoiding an obstacle by an autonomous lawn mower further includes the following steps:

S111: An ultrasonic signal is sent to a surrounding environment.

S112: A reflection signal of an ultrasonic signal is received from the surround environment.

S113: It is determined, according to the reflection signal, whether there is an obstacle within a first height range is determined.

Further, in one embodiment, the step of the determining whether there is an obstacle within a first height range specifically includes:

acquiring a first preset parameter value indicating that there is an obstacle within the first height range; and determining that there is an obstacle within the first height range when a first parameter value of the reflection signal is greater than the first preset parameter value indicating that there is an obstacle within the first height range.

The first parameter value of the reflection signal is a strength value of the reflection signal.

Further, in one embodiment, the step of acquiring a first signal indicating that there is an obstacle within the first height range further includes:

S114: A time difference between a moment at which the ultrasonic wave is transmitted and a moment at which the ultrasonic wave is received is converted into a second parameter value of the first signal, the second parameter value of the first signal being used to represent a distance between the autonomous lawn mower and both obstacles within the first height range.

In particular, an ultrasonic transmitting device transmits an ultrasonic wave toward a direction, the ultrasonic wave propagating in the air and returning instantly when colliding with an obstacle during propagation. An ultrasonic receiving device receives an ultrasonic wave that is reflected, calculates signal strength of the ultrasonic wave that is reflected, and acquires a preset signal strength value of the ultrasonic wave that is reflected. When a reflected ultrasonic signal strength value is greater than a preset ultrasonic signal strength value, it is determined that there is an obstacle within the first height range.

Further, timing is started at the same moment at which the ultrasonic wave is transmitted, and the ultrasonic receiving device stops timing immediately after receiving the reflected ultrasonic wave. That is, a timer records a time difference T between the moment at which the ultrasonic wave is transmitted and the moment at which the ultrasonic wave is received. The time difference T is defined as a first signal parameter value representing a distance between an autonomous walking apparatus and an obstacle.

Within a time period between the moment at which the ultrasonic wave is transmitted and the moment at which the ultrasonic wave is received, the ultrasonic wave moves back and forth between the obstacle and the autonomous lawn mower. A propagation speed of the ultrasonic wave in the air is denoted as V. According to the time T recorded by the timer, a distance S between a transmitting device and an obstacle may be calculated, that is, $S=V*T/2$.

Referring to FIG. 13, in one embodiment, a method for avoiding an obstacle by an autonomous lawn mower further includes the following steps:

S211: A second preset parameter value of a first signal is acquired.

S212: When a second parameter value of the first signal is less than the second preset parameter value of the first signal, an obstacle-avoidance instruction is issued.

In particular, in order to set the second preset parameter value of the first signal, the second preset parameter value of the first signal may be directly implanted into a control program and is directly invoked when the program is executed. Alternatively, the second preset parameter value of the first signal that is directly input by the outside is received and is further stored in a memory. The second preset parameter value of the first signal in the memory is invoked when the program is executed. The second preset parameter value of the first signal may be a time parameter, or may be a distance parameter.

When the second preset parameter of the first signal is the time parameter, the first signal parameter value T is compared to a preset time parameter. When the first signal parameter value T exceeds the preset time, an obstacle-avoidance instruction is issued.

When the second preset parameter of the first signal is the distance parameter, because the propagation speed of the ultrasonic wave in the air is about 340 m/s, the distance parameter may be converted into the time parameter. The first signal parameter value T is compared to the converted time parameter. When the first signal parameter value T exceeds the preset time, an obstacle-avoidance instruction is issued.

The autonomous lawn mower is installed with an ultrasonic probe. At a position with a certain distance from an obstacle, the autonomous lawn mower performs an avoidance action against the obstacle to avoid a collision with the obstacle, further preventing damage to the obstacle and the autonomous lawn mower as a result of the collision.

Figure 14:
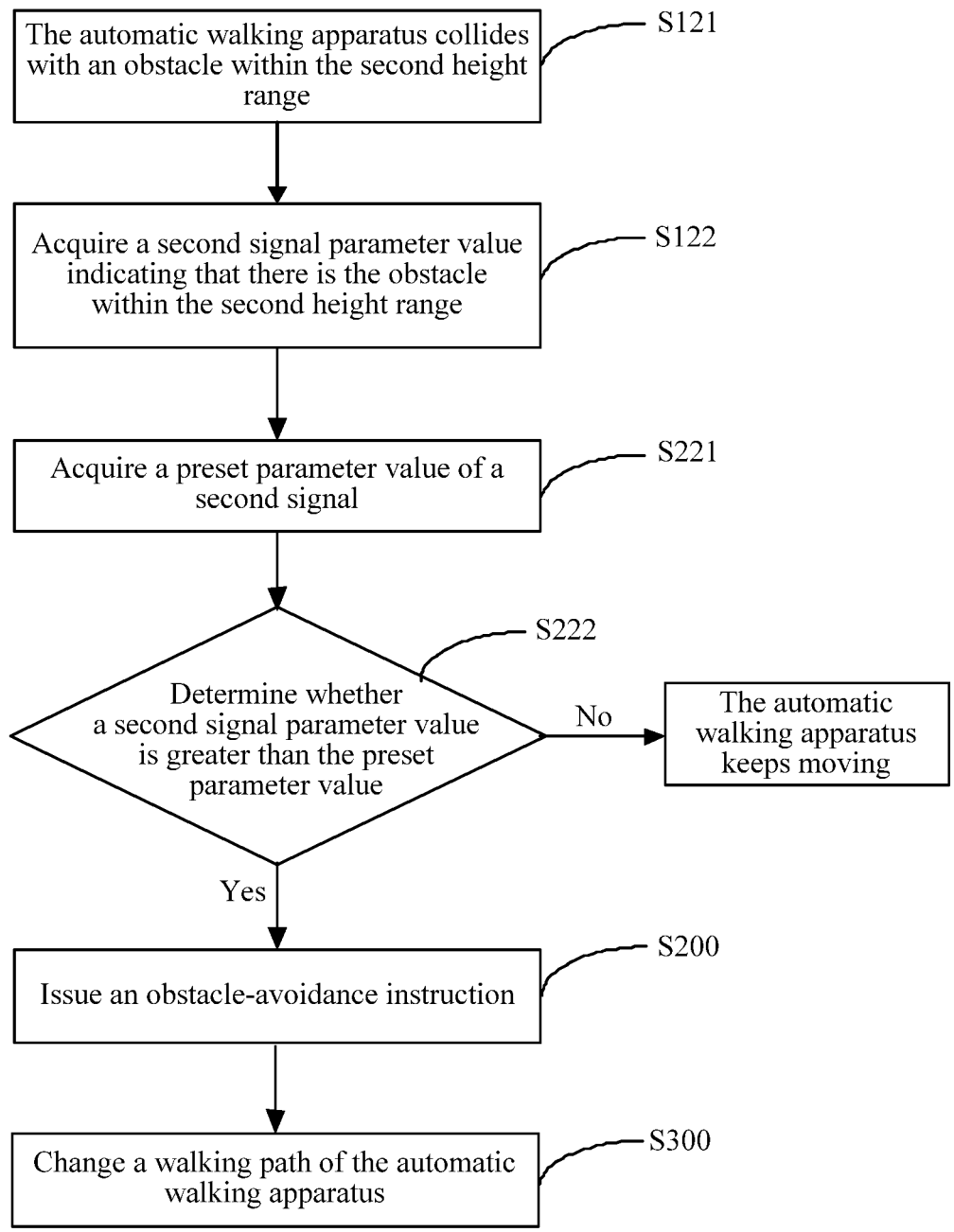
FIG. 14 is a flowchart of a method for avoiding an obstacle by an autonomous lawn mower in another preferred embodiment according to the present invention.

Further, referring to FIG. 14, in another embodiment, a method for avoiding an obstacle by an autonomous lawn mower further includes the following steps:

S121: The autonomous lawn mower collides with an obstacle within a second height range.

S122: A second signal parameter value indicating that there is an obstacle within the second height range is acquired.

The autonomous lawn mower encounters obstacles such as flowers and bushes within the second height range when mowing, such obstacles being beyond a detection area of the ultrasonic wave. The autonomous lawn mower inevitably collides with the obstacles within the second height range.

Deformation of a housing of the autonomous lawn mower is detected using a magnetic block and a Hall element, and it is further determined whether a collision occurs to the autonomous lawn mower. The magnetic block is fixed to the housing of the autonomous lawn mower, and the Hall element is distributed within a range of the magnetic field of the magnetic block.

When the autonomous lawn mower collides with an obstacle, the housing is deformed. The magnetic block is displaced relative to the Hall sensor with the deformation of the housing, the magnetic field changes due to a change in a position of the magnetic block, and the Hall element may be used to detect the displacement of the magnetic block. The Hall element converts the detected physical quantity of the displacement into an electric quantity, thereby controlling the autonomous lawn mower. An electric quantity signal output by the Hall element is defined as the second signal parameter value.

S221: A preset parameter value of a second signal is acquired.

S222: When the second signal parameter value is greater than a preset parameter value of the second signal, an obstacle avoidance instruction is issued.

In particular, in order to set the preset parameter value of the second signal, the preset parameter value of the second signal may be directly implanted into a control program and, and is directly invoked when the program is executed. Alternatively, the preset parameter value of the second signal directly input by the outside is received and further stored in a memory, and the preset parameter value of the second signal in the memory is invoked when the program is executed. The second signal parameter value is an electric quantity parameter.

The second signal parameter value is compared to the preset electric quantity parameter of the second signal. When the second signal parameter value is greater than the preset electric quantity parameter value of the second signal, an obstacle-avoidance command is issued.

For an obstacle beyond the ultrasonic detection area, the Hall element is configured to detect the displacement of the magnetic block, thereby detecting that the autonomous lawn mower collides with an obstacle, and further controlling the autonomous lawn mower to turn and move backward to reduce damage to the obstacle.

In the method for avoiding the obstacle by the autonomous lawn mower, two sensors including the ultrasonic probe and the Hall element are jointly used to detect obstacles within different height ranges. When working in a complex environment with flowers, trunks, and bushes, etc., the autonomous lawn mower uses the obstacle avoidance method to perform an avoidance action, which is more intelligent to be adapted to the complex working environment, and safety of the autonomous lawn mower is improved.

In one embodiment, an obstacle-avoidance system of the autonomous lawn mower specifically includes:

a first detecting module configured to acquire a first signal indicating that there is an obstacle within a first height (H1) range;

a second detecting module disposed below the first detecting module configured to acquire a second signal indicating that there is an obstacle within a second height (H2) range;

a processing module configured to issue an obstacle-avoidance instruction according to the first signal and the second signal; and a control module configured to control a walking path of the autonomous lawn mower according to the obstacle-avoidance instruction.

Further, the first detecting module includes an ultrasonic probe. The ultrasonic probe is configured to transmit and receive an ultrasonic signal. The ultrasonic probe is installed on a fixing base of the ultrasonic probe, the fixing base of the ultrasonic probe being disposed on a top of the housing of the autonomous lawn mower. A second detecting module includes a magnetic block and a Hall element for inducing the magnetic block. The Hall element is configured to detect whether the magnetic block is displaced. The Hall element includes at least two Hall sensors.

Figure 15:
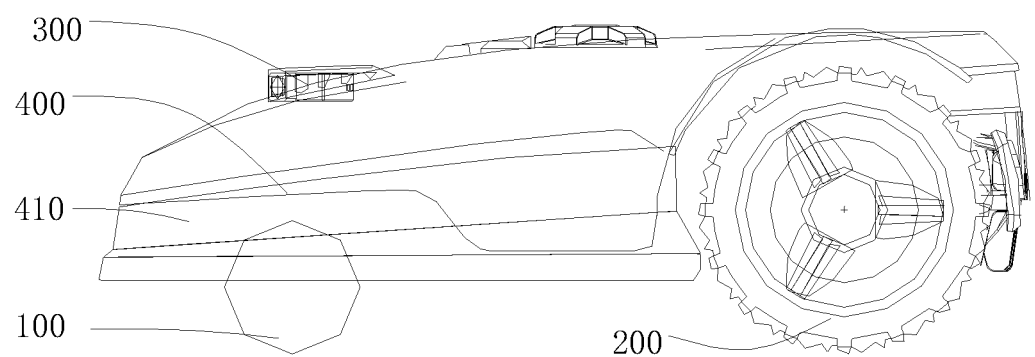
FIG. 15 is a schematic diagram of an autonomous lawn mower in an embodiment according to the present invention.
Figure 16:
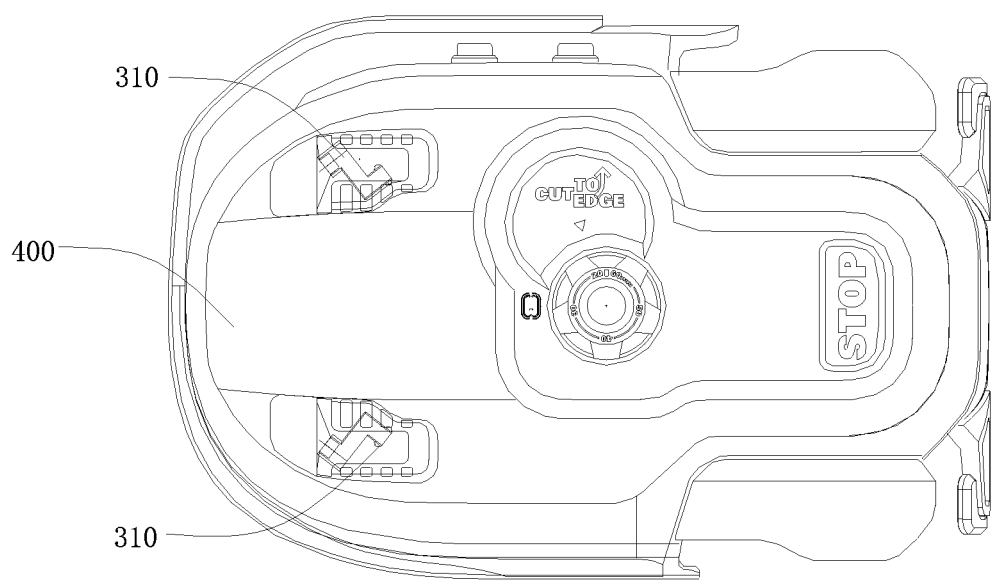
FIG. 16 is a schematic diagram of an autonomous lawn mower in an embodiment according to the present invention.
Figure 17:
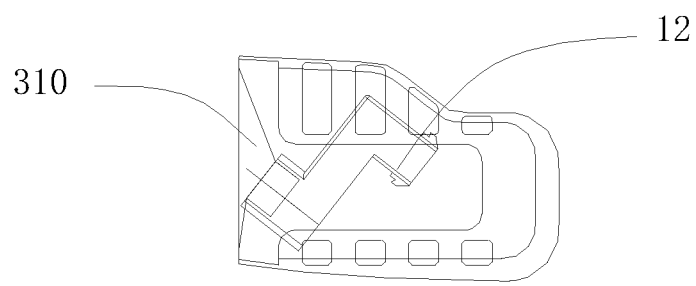
FIG. 17 is a schematic diagram of an ultrasonic obstacle avoidance component of an autonomous lawn mower in an embodiment according to the present invention.

In one embodiment, the obstacle-avoidance system of the autonomous lawn mower specifically includes: an ultrasonic module and an auxiliary detecting module. As shown in FIG. 15, the autonomous lawn mower 10 includes a housing 400, a movement module 600 including a driving wheel 100 and a driven wheel 200, a cutting module 700, an ultrasonic module 300, and an auxiliary detecting module 410, etc. The driving wheel 100 supports the housing 400, which is subject to forward ground friction force to provide a driving force for the autonomous lawn mower 10 to travel. The driven wheel 200 supports the housing 400 and travels with the body of the driving wheel 100, and the driven wheel 200 may be rotatable within a predetermined angle range. The ultrasonic module 300 includes an ultrasonic probe 12. Referring to FIG. 16 and FIG. 17, the autonomous lawn mower 10 is provided with two fixing bases 310 of the ultrasonic probe, which are respectively installed on left and right sides of the housing 400. The ultrasonic probe 12 is installed on the fixing base 310 of the ultrasonic probe. Lateral coverage of the ultrasonic probe is 110%, and a recognition distance of the ultrasonic probe is 5-95 mm. In this embodiment, the auxiliary detecting module 410 may be a non-contact detecting module, such as the ultrasonic module, or may be a contact detecting module, such as the Hall element.

In one embodiment, an angle between an ultrasonic axis and an central axis of the autonomous lawn mower ranges from 30° to 50°, and a horizontal distance between a front end of the fixing base of the ultrasonic probe and a front end of the housing ranges from 110 mm to 130 mm. An installation position of the ultrasonic probe determines that the angle between the ultrasonic axis and the central axis of the autonomous lawn mower is 38°, so that the ultrasonic wave can detect an obstacle on one side of the autonomous lawn mower, and has a wide detection area in a horizontal direction. A horizontal distance between the front end of the fixing base of the ultrasonic probe and the front end of the housing is 126.4 mm. Therefore, the autonomous lawn mower has no blind area.

The foregoing autonomous lawn mower may detect obstacles within different height ranges. When working in a complex environment with flowers, trunks, and bushes, the autonomous lawn mower performs an avoidance action, which is more intelligent to be adapted to the complex working environment, and safety of the autonomous lawn mower is improved.

A specific application scenario of an embodiment of the present invention is described below with reference to FIG. 18.

There are obstacles such as trunks, flowers, bushes, and chairs on a lawn. These obstacles vary in height, for example, heights of the flowers and bushes are lower than a height of the lawn mower, and heights of the trunks and chairs are higher than the height of the lawn mower. The obstacle-avoidance system of the lawn mower provided in the present invention includes an ultrasonic probe and a Hall element.

The ultrasonic probe is installed on a top of the housing of the autonomous lawn mower. There are at least two ultrasonic probes, so that the lateral coverage of the ultrasonic probe is 110%. The ultrasonic probe detects an obstacle with a relatively high height, such as trunks, and a height at which the ultrasonic probe performs detecting is denoted as H1. When there is an obstacle within the first height (H1) range, the ultrasonic wave is reflected by the obstacle, and the ultrasonic probe receives an ultrasonic signal reflected by the obstacle. Through processing and calculation, a distance between the obstacle and the autonomous lawn mower is obtained. Because the propagation speed of the ultrasonic wave in the air is 340 m/s, a distance parameter may also be converted into a time parameter. A preset parameter value is acquired, and the time parameter or the distance parameter obtained through processing is compared to the preset time parameter or distance. When the parameter value obtained through processing exceeds the preset parameter value, an obstacle-avoidance instruction is issued. The autonomous lawn mower changes the walking path, such as turning, according to the obstacle-avoidance instruction. Therefore, the autonomous lawn mower may be controlled to perform an avoidance action using the ultrasonic probe at a position with a certain distance from an obstacle, preventing a collision between the obstacle and the autonomous lawn mower.

A distance from a bottom of the autonomous lawn mower to the ground is 60 mm, so that the autonomous lawn mower may pass smoothly when encountering an obstacle with a height less than 60 mm. When the obstacle is higher than 60 mm and is located within the height H2 range, the obstacle cannot be covered by the ultrasonic detection area, and such obstacle may be avoided using the magnetic block and the Hall element. The magnetic block is fixed on the housing of the autonomous lawn mower. The Hall element is distributed within a magnetic field range of the magnetic block for determining whether the magnetic block moves by detecting a change in the magnetic strength. When the autonomous lawn mower collides with an obstacle within the second height (H2) range, the housing deforms due to the collision, and the magnetic block is displaced to some extent relative to the Hall sensor with the deformation of the housing. The Hall sensor detects displacement of the magnetic block and further detects that the autonomous lawn mower collides with an obstacle, further controlling the autonomous lawn mower to avoid the obstacle, for example, moving backward.

The autonomous lawn mower and a method for avoiding the obstacle thereby provided in one embodiment of the present invention are used to detect obstacles within different height ranges. When working in a complex environment with flowers, trunks, and bushes, the autonomous lawn mower performs an avoidance action, which is more autonomous to be adapted to the complex working environment, and safety of the autonomous lawn mower is improved.

The above embodiments are merely intended for describing the technical solutions of the present invention rather than limiting the present invention. Although the present invention has been described in detail with reference to the foregoing embodiments, persons of ordinary skill in the art should understand that they may still make modifications to the technical solutions recorded in the foregoing embodiments or make equivalent substitutions to some technical features thereof, as long as such modifications or substitutions do not cause the essence of corresponding technical solutions to depart from the scope of the technical solutions of the embodiments of the present invention.

What is claimed is:

1. A self-moving apparatus, comprising:
   a housing;
   a driving wheel and a driven wheel installed on the housing for driving the housing to move;
   an ultrasonic probe configured to transmit an ultrasonic signal and receive an echo signal formed through reflection of the ultrasonic signal by an obstacle;
   a main control board, installed on the housing and connected to the ultrasonic probe, configured to implement an ultrasonic detection function by processing the echo signal transmitted to the main control board from the ultrasonic probe, thereby controlling a movement mode of the driving wheel and the driven wheel; and
   an energy module, connected to the main control board, configured to monitor a current electric quantity of the self-moving apparatus, and to send a low-energy signal to the main control board when the current electric quantity is insufficient,
   wherein the main control board is configured to disable the ultrasonic detection function according to the low-energy signal sent by the energy module, the low-energy signal being an energy signal whose energy is less than a preset energy, and to control the self-moving apparatus to return to a charging station based on a generated return path according to a current position of the self-moving apparatus or a predetermined return path.

2. The self-moving apparatus according to claim 1, wherein the main control board is further configured to disable the ultrasonic detection function according to a manual control signal.

3. The self-moving apparatus according to claim 2, wherein the manual control signal is generated by a user operation.

4. The self-moving apparatus according to claim 2, wherein the self-moving apparatus is configured to communicate with the main control board, and receive the manual control signal sent by a terminal.

5. The self-moving apparatus according to claim 2, wherein the self-moving apparatus comprises a display apparatus connected to the main control board, the manual control signal being generated by the display apparatus.

6. The self-moving apparatus according to claim 1, wherein the main control board is further configured to disable the ultrasonic detection function according to an abnormal signal.

7. The self-moving apparatus according to claim 6, wherein the abnormal signal comprises a valid signal that satisfies a preset condition.

8. The self-moving apparatus according to claim 7, wherein the preset condition comprises a time being greater than a preset time or a number being greater than a preset number.

9. The self-moving apparatus according to claim 7, wherein the valid signal comprises an echo signal with strength greater than a preset strength.

10. The self-moving apparatus according to claim 1, wherein the disabling of the ultrasonic detection function comprises stopping operation of the ultrasonic probe.

11. The self-moving apparatus according to claim 1, wherein the disabling of the ultrasonic detection function comprises stopping processing the echo signal by the main control board.

12. The self-moving apparatus according to claim 1, wherein a detection range of the ultrasonic probe in a height direction is a first height range, and the self-moving apparatus further comprises an auxiliary detecting probe configured to detect an obstacle within a second height range.

13. The self-moving apparatus according to claim 12, wherein the main control board controls the movement mode according to an output signal of the ultrasonic probe or the auxiliary detecting probe.

14. A method for controlling a self-moving apparatus, the self-moving apparatus comprising a driving wheel and a driven wheel, an ultrasonic probe, a main control board, and an energy module, the ultrasonic probe transmitting an ultrasonic signal and receiving an echo signal formed through reflection of an obstacle, the main control board being connected to the ultrasonic probe to implement an ultrasonic detection function, thereby controlling a movement mode of the driving wheel and the driven wheel, and the energy module connected to the main board to monitor a current electric quantity of the self-moving apparatus, and to send a low-energy signal to the main control board when the current electric quantity is insufficient;

wherein the control method comprises:
- receiving, by the main control board, a the low-energy signal sent by the energy module, the low-energy signal being an energy signal whose energy is less than a preset energy;
- controlling, by the main control board, disabling of the ultrasonic detection function based on at least the low-energy signal; and
- controlling the self-moving apparatus to return to a charging station based on a generated return path according to a current position of the self-moving apparatus or a predetermined return path.

* * * * *